(12) United States Patent
Martin

(10) Patent No.: US 6,810,118 B1
(45) Date of Patent: Oct. 26, 2004

(54) SERVICE CREATION IN AN INTELLIGENT NETWORK

(75) Inventor: Peter Martin, Swanage (GB)

(73) Assignee: Marconi Communications Limited, Coventry (GB)

( * ) Notice: Subject to any disclaimer, the term of this patent is extended or adjusted under 35 U.S.C. 154(b) by 0 days.

(21) Appl. No.: 09/831,264

(22) PCT Filed: Oct. 7, 1999

(86) PCT No.: PCT/GB99/03313

§ 371 (c)(1), (2), (4) Date: May 8, 2001

(87) PCT Pub. No.: WO00/30372

PCT Pub. Date: May 25, 2000

(30) Foreign Application Priority Data

Nov. 12, 1998 (GB) .............................................. 9824829

(51) Int. Cl.[7] .............................................. H04M 7/00
(52) U.S. Cl. .............................. 379/221.08; 379/207.02
(58) Field of Search ....................... 379/221.08, 207.02; 706/13

(56) References Cited

U.S. PATENT DOCUMENTS

| | | | |
|---|---|---|---|
| 5,343,554 A | * | 8/1994 | Koza et al. .................... 706/13 |
| 5,581,657 A | | 12/1996 | Lyon |
| 5,742,738 A | | 4/1998 | Koza et al. |
| 5,764,857 A | | 6/1998 | Suzuki |
| 5,946,383 A | | 8/1999 | Havens et al. |
| 6,226,373 B1 | * | 5/2001 | Zhu et al. ............... 379/207.02 |

* cited by examiner

Primary Examiner—Ahmad F. Matar
Assistant Examiner—Rasha S Al-Aubaidi
(74) Attorney, Agent, or Firm—Kirschstein et al.

(57) ABSTRACT

An alternative method to the existing manual service creation exploits the properties of genetic programming (GP) to produce service logic programs for an intelligent network. For GP to be of benefit to an intelligent network, it must be able to reduce the time to create a service and reduce the number of implementation errors in the resultant program.

10 Claims, 21 Drawing Sheets

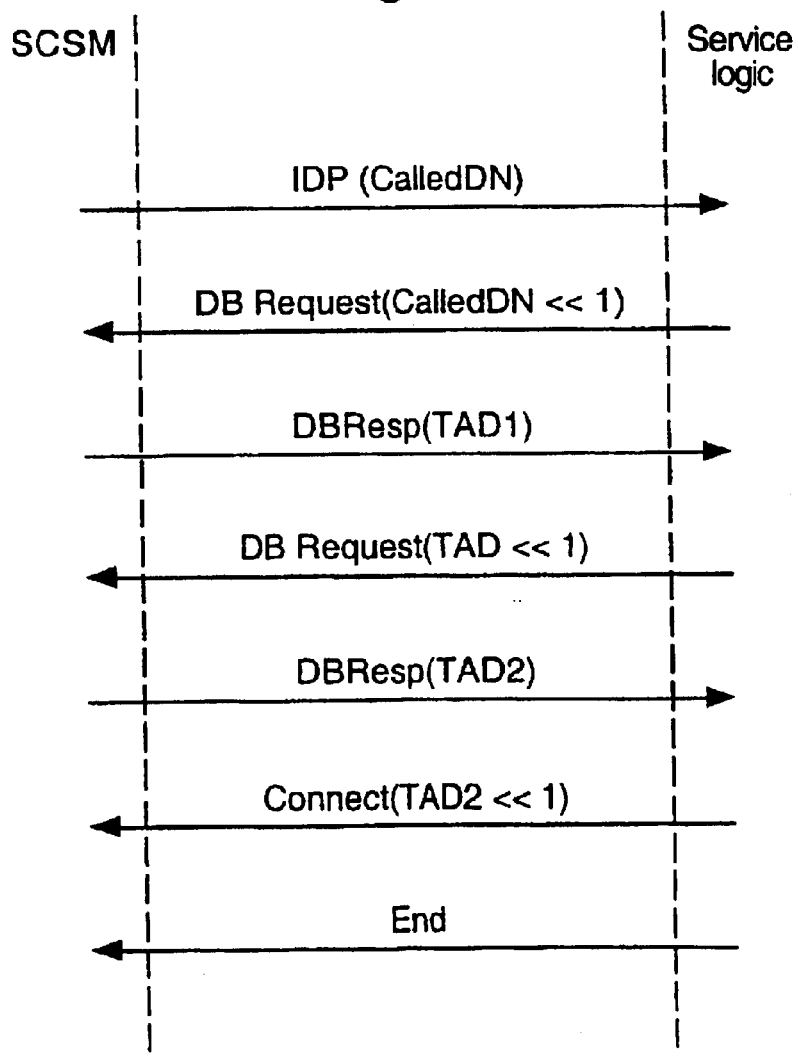

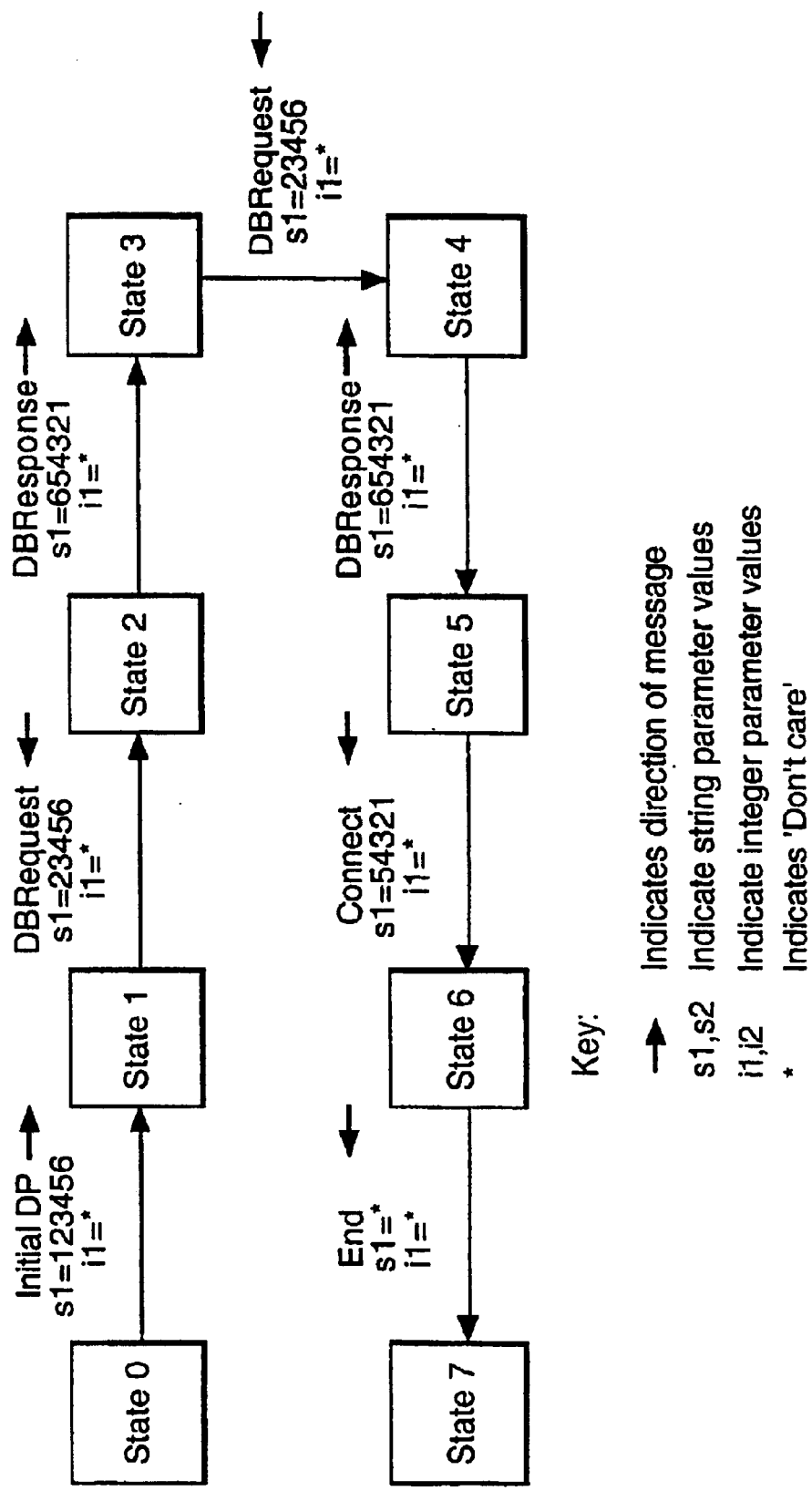

```
MAIN ()
{
    INT A=10;
    INT B=20;
    PRINTF ("SUM = %D\N" , A + B) ;
}
```

SERVICE CREATION IN AN INTELLIGENT NETWORK

As telecommunication systems become more complex and the effort needed to create services in a timely manner becomes greater, so the need for alternative means of realising systems becomes more urgent.

It has been considered how a method from the field of evolutionary computing can be of assistance in the field of Intelligent Networks (IN) in helping to create new telecommunications services.

The premise used is that in a branch of evolutionary computing, a system can translate a specification into an implementation without the direct assistance of a human programmer. The benefits to be gained are faster system realisation and a more reliable implementation by focusing the effort on the requirements of a system rather than it's implementation.

Starting from the idea that some form of automatic programming was a feasible method to use, a detailed analysis of one method—Genetic Programming (GP)—was made. From this analysis a number of questions were raised concerning the basic feasibility, performance and scalability.

Traditional telephony in the past 20 years has concentrated on delivery telephony services to customers by means of stored program switches. Customers have, until recently, been restricted to relatively crude terminal equipment that supports voice and Dual Tone Multi Frequency (DTMF) user controls.

As the number of services offered has grown and the sophistication of telephone equipment has risen, it has become clear that offering services via the traditional embedded switch technology does not scale well, and that other platforms for providing the services are required.

One approach used is Intelligent Networks (IN), the primary objective of Intelligent Networks being to move the service computation to readily available computers. A basic Intelligent Network is shown in FIG. 1.

The functions carried out by the various components of the Intelligent Network are:

| Key | Name | Function |
| --- | --- | --- |
| BCSM | Basic Call State Machine | The description of the internal operation of the IN portion on an SSP |
| SCP | Service Control Point | The computing platform that executes the service logic |
| SCEP | Service Creation Environment Point | Used to create the services that execute on the SCP |
| SDP | Service Data Point | Supplies database functionality |
| SMP | Service Management Point | Used to manage the network and subscriber data |
| SSP | Service Switching Point | Performs normal telephony and associated service triggering |

A secondary aim of introducing IN was to reduce the time required to develop and deploy new services. Traditional switch based solutions typically require 2 years from the initial requirements being specified until the service is in operation. In a highly competitive environment this is too long, and the market window will have disappeared by the time the services come into operation. IN aims to reduce this by exploiting mainstream IT techniques.

In the following references to the bibliography will be indicated by [XXXNN] and details of the references are placed at the end of the description.

One such system has been developed by the former GPT Limited, now Marconi Communications Limited and is marketed as GAIN Inventor(™). This employs a service creation life-cycle shown in FIG. 2. This shows a simplified waterfall model where the stages 1–4 as a whole map to sub-goals 2 to 7 described by Boehm [Boe81] Chap. 4. Page 37. An implicit assumption is that the feasibility of a service has already been established. Maintenance and phase out are part of the service creation process but are not considered for development purposes.

The first two phases occur when either a customer specifies their service requirements directly to the provider of the network, or as a result of collaboration between user and provider. They are carried out using the tools and techniques provided by the IN equipment vendor. During the requirements capture phase, it is quite likely that the same tools will be used in order to produce rapid prototypes to that the customer can verify the essential requirements early on in the development of the service.

In the GAIN Inventor(™)system the user selects sets of iconic images from a palette and joins them together to create a directed graph. Each node (icon) in the graph has a set of attributes that the service creator can change to determine the eventual behaviour of the service being constructed.

A compiler is used to translate the abstract service representation to C code that conforms to the requirements of the run-time environment.

Experience has shown that the time required to complete the first phase is relatively short, but the time required to implement complex services in phases 2 and 3 can be several months. A typical non-trivial service can require several thousand icons, and results in dozens of valid traversals of the graph. A means of reducing the duration of these phases is therefore of benefit to the network and service operators.

The major problems encountered in the existing system are associated with software engineering management issues namely, productivity and quality control. Despite the promises of the early IN systems and the advanced tools available, complex services still take a considerable amount of time to develop using traditional software engineering techniques and there is still a level of defects found in the service themselves.

The present invention addresses the difficulties with the first two phases by automatically deriving an implementation from the requirements, or as Teller (TA97], Langdon [Lan98] and others put it, by using Automatic Programming. This approach was hinted at by Boehm [Boe81] Chap. 33 where a mention is made of automatic programming. In 1981 the idea was considered interesting but 'somewhat beyond the current frontier of the state of the art'. It is demonstrated that automatic programming such as by using Genetic Programming (GP) for example is now a viable alternative in the domain of IN.

GP has demonstrated that it can produce results that are at least as good as a human programmer and in some cases provide solutions to problems that a human has not been able to achieve as in the case of discovering an electronic circuit to yield a cube root function [KBF96], and to create a rule for cellular automata that has also shown that programs for Digital Signal Processors (DSPs) evolved using GP can outperform existing programs.

An existing service creation case study can be considered. This study showed that for t a complex service a human required 4.5 man years of effort to analyse, design, code and test the service. The principal measurable attribute is therefore the elapsed time required to implement the service and this attribute will be quantified for GP by experimental data presented later. Other attributes are cost of equipment and the degree of human intervention required but are not considered further in this work.

A key measurable attribute of the program is the level of defects. Broadly defects fall into one of two categories [Som96]; errors due to incorrect requirements analysis and errors due to implementation deficiencies either by errors in programming or design. The first type is common to whatever method of programming is adopted. As summarised by Davis [Dav93] the earlier requirement related errors are found, the lower the cost to remedy the error. As will be seen later using GP forces the designer to consider requirements in more detail initially (for fitness evaluation) so the implication is that using GP will result in fewer errors introduced by faults in the requirements. Even using advanced tools such as Inventor, in one case there were 15 failures associated with the service. Anecdotal evidence suggests that these were all implementation errors.

There is no existing information on using GP for IN services creation.

The question of whether GP can scale can only be answered in full by analysing experimental data, but initial indications show that GP can create programs to solve complex problems in other domains.

It is worth noting that other alternatives such as artificial neural networks, hill climbing, decision trees, reinforcement learning, combinatorial search or knowledge based systems have not been explored in the context of this problem, but Koza [Koz96] makes a powerful argument why such a comparison would not be beneficial anyway. The main point of his argument is that most machine leaning paradigms are highly specialised and any attempt to do a cross paradigm comparison will 'gravitate to utterly trivial problems'.

Notwithstanding the above, one area that promises to offer a viable alternative to GP is Inductive Logic Programming [BG95], and a useful comparison has been made between Inductive Logic Programming and GP by Tang [TCM98] albeit for a fairly simple problem. Furthermore some limited experimental results have been presented between traditional Genetic Algorithms (GA) and GP in the domain of telecommunications applications by Sinclair [SS97 and Aiyarak [ASS97]. None of these comparisons offers any convincing arguments in favour of any particular method, indeed, the comparisons between GA and GP give contradictory results and appear to be heavily influenced by the type of problem being solved.

According to the present invention there is provided a method of creating a service for an Intelligent Network (IN) system, the service having a series of service requirements, the method comprising the steps of:

(a) Using Evolutionary Programming to derive programs to operate a Basic Call State Machine of the IN to provide the service from the service requirements;

(b) Evaluating a fitness function for programs.

(c) Selecting a program from those derived.

There is further provided a service creation means as claimed in anyone of claims 8 to 10, wherein the fitness evaluating means provides the weighted sum of the number of correctly sequenced messages that a Service Switching Point (SSP) in an IN would receive and the weighted sum of the number of correct message parameters that the SSP would receive.

In both cases a preferred form of Evolutionary Programmning is Genetic Programming.

The present invention will now be described by way of example, with reference to the accompanying drawings, in which:

FIG. 5 shows a layout of autonomous polymorphic addressable memory;

FIG. 9 illustrates a message sequence chart for an extended number translation service;

FIG. 10 shows a state diagram for extended number translation;

Genetic Programming (GP) is an extension of Genetic Algorithms (GA) first proposed by Holland [Hol92] where the individuals that make up a population are not fixed length, limited alphabet strings, but rather structures that represent programs. The structures are typically trees that describe the program [Koz92], but may take on other forms such as binary string [Ban93]. The purpose therefore is to evolve programs that can solve the problem presented to the system.

GP uses four steps to solve a problem:

1. A set of individuals (programs) is randomly created. This is the initial population.
2. These are then evaluated (executed or interpreted) for fitness, and a fitness value is assigned to each individual.
3. These individuals are then used to form the next population by means of probabilistically selecting one of:
   asexual reproduction
   sexual reproduction or crossover
   mutation
4. This cycle is repeated until either a pre-determined number of generations have been processed or an individual meets a predetermined level of fitness.

Figure 3:
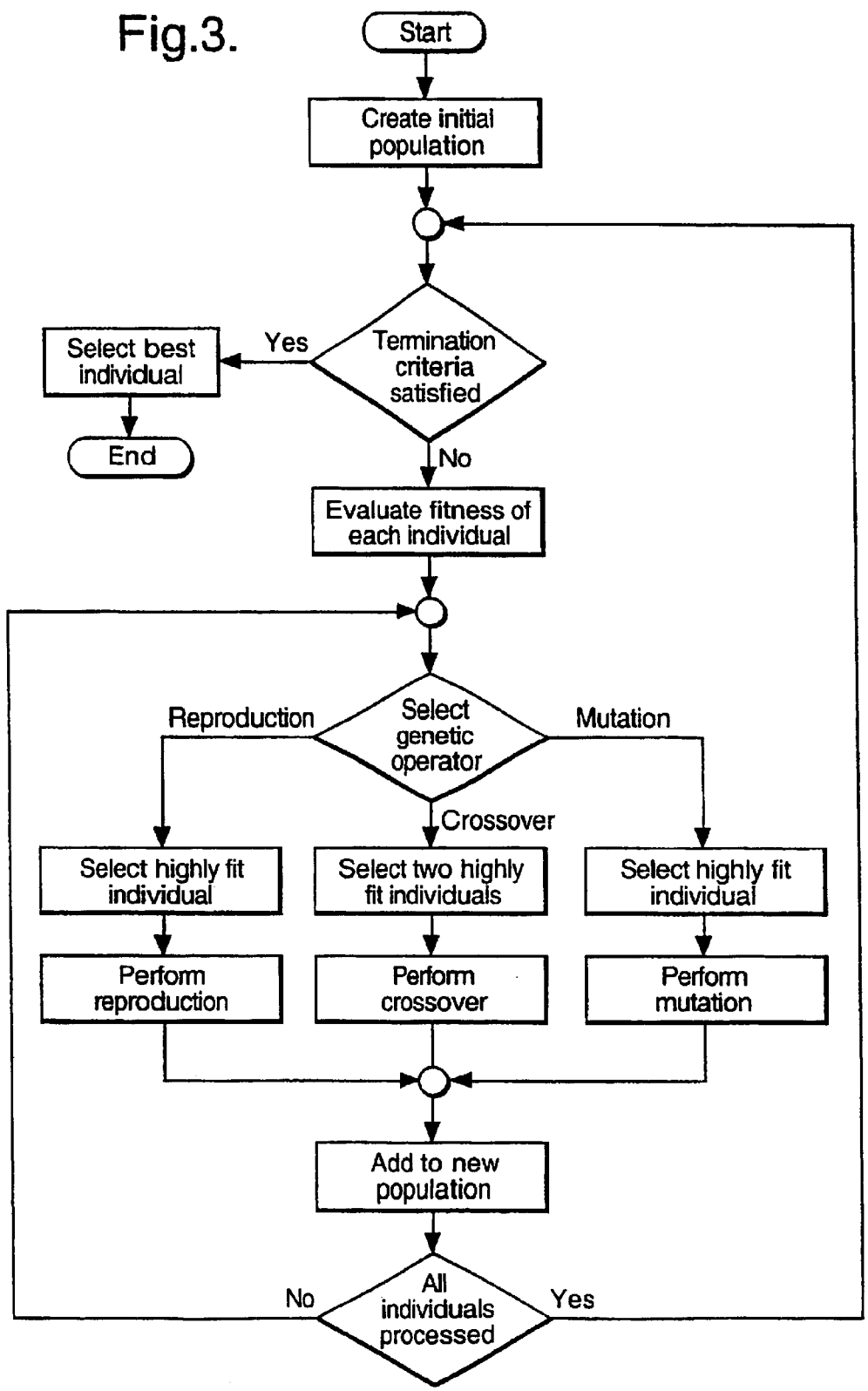
FIG. 3 shows a flowchart of genetic programming.

This is illustrated as a flow chart in FIG. 3.

In class tree based GP each genetic program consists of one or more nodes, chosen from one of two sets. The non-leaf nodes are known as the function set $F=\{f_1 \ldots, f_n\}$.

All nodes in F have arity (that is can take a number of arguments) one or greater. The leaf nodes are the terminal set $T=\{t_1 \ldots t_n\}$. Nodes in T have arity of zero.

If the members of T are considered as functions with arity zero, then the total set of nodes is:

$$C = F \cup T$$

The search space is the set of all possible compositions of the members C. This set must exhibit two properties [Koz92]: closure and sufficiency.

Closure requires each member of C to accept as its arguments any other member in C. This property is required in order to guarantee that programs can operate without run-time errors being generated. The common example cited is that of protecting the division operator to prevent division by zero errors, but also extends to data types used when calling functions and accessing terminal types.

This may be achieved in a number of ways. Firstly Koza [Koz92] restricts the types of arguments and function return types to compatible. For instance, all floating point types as in the symbolic regression examples or logical in the Boolean examples. For simple problems with single data types this is sufficient.

Secondly, in strongly typed approaches such as those described by Montana [Mon95] and Haynes et al [HWSS95] constraints are placed on the creation of individuals to satisfy the type rules. The advantage here is reducing the size of the search space by eliminating individuals that would fail due to syntax errors. Clack [CY97] extended this work to show that expression based parse trees can yield more correct programs, and introduced the idea of polymorphism into the data types. Later an alternative is presented to strongly type approaches that removes some of the deficiencies.

The sufficiency property requires that the set of functions in C is sufficient to express a program capable of solving the problem under consideration [Koz92]. This is a problem specific property and must be determined before any GP can be evolved. This together with determining a suitable fitness test requires the most effort by a user of GP.

To create the initial population a number of randomly selecting nodes from the function set F is used to build trees according to the arity of the function. Leaf nodes from T are inserted according to certain criteria. Two main methods are described by Koza [Koz92]; the full, and the grow methods.

In the full method, members of F are selected until the tree reaches a pre-determined depth, then from T. This results in trees with uniform depth.

The grow method differs in that a node is selected from C if the depth is less than a pre-determined maximum, else it selects from T.

A third method combining the full and grow is called 'ramped half and half'. Ramped half and half operates by creating an equal number of trees with a depth between 2 and a pre-determined maximum. That is if the maximum depth is 10, then 1/9 will have depth 2, 1/9 depth 3 and so on up to a depth 10. Then for each depth, 50% of the trees are created using the full method and 50% using the grow method. This is claimed by Koza [Koz92] to offer a wider variety of shapes and size in the initial population. The difference in performance between the three methods is documented in [Koz92] and [Ban93], with ramped half-and-half clearly yielding higher probabilities of success on a number of problems. Therefore this is the method used in all cases in the work described herein.

During the operation of GP, one of three methods of producing the next generation are used, reproduction, crossover and mutation.

Reproduction is the straightforward copying of an individual to the next generation, otherwise known as Darwinian or asexual reproduction.

Figure 4:
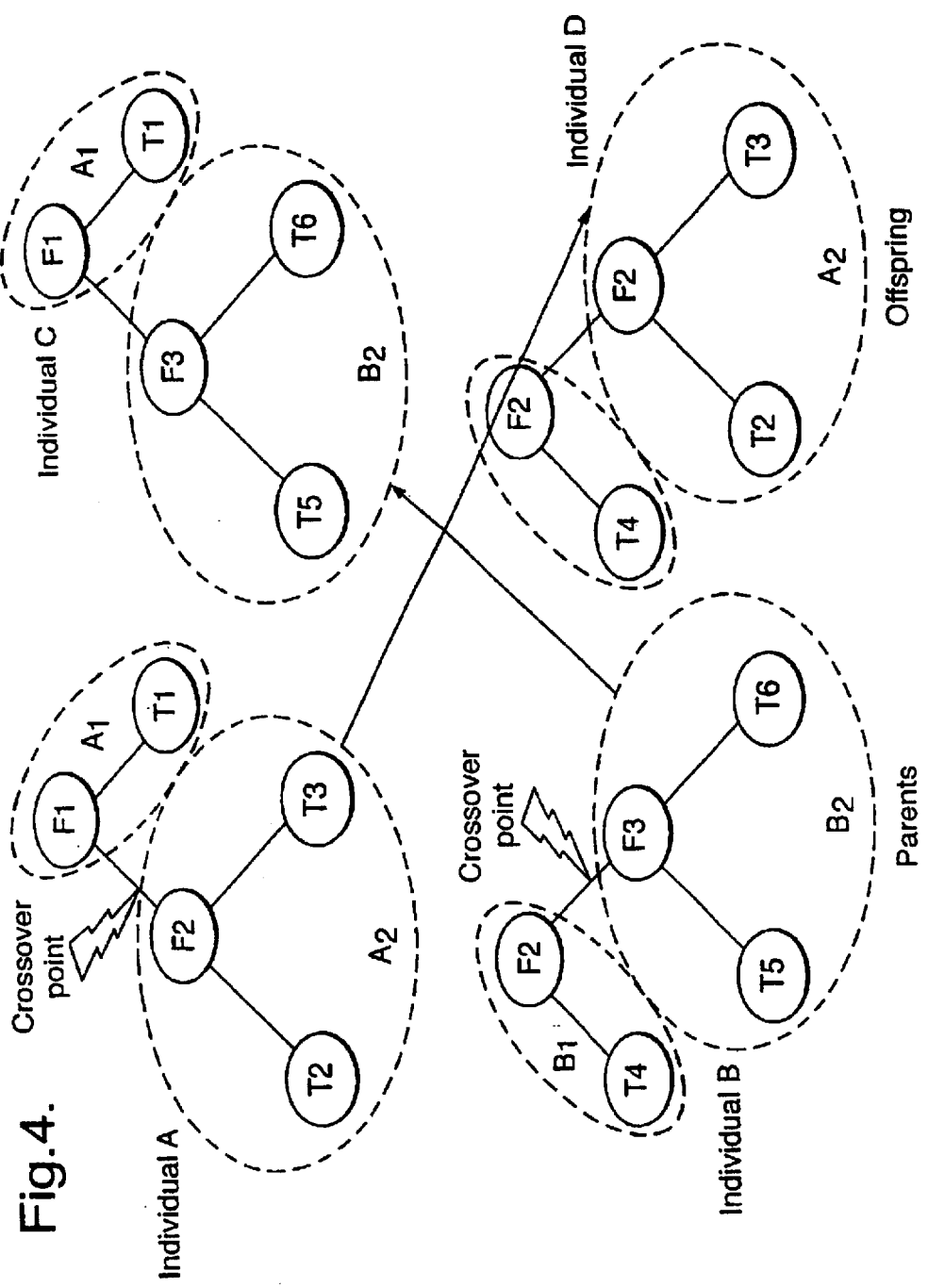
FIG. 4 illustrates the operation of crossover in genetic programming.

Crossover, or sexual recombination, consists of taking two individuals A and B, and randomly selecting a crossover point in each. The two individuals are then split at these points creating four sub-trees $A_1$ $A_2$ $B_1$ $B_2$, and two new individuals created C and D by combining $A_1$ $B_2$ and $B_1$ $A_2$. This is shown in FIG. 4.

Mutation consists of randomly selecting a mutation point in a parse tree and substituting a new randomly generated sub-tree at that point.

There is still much debate over whether crossover and mutation are useful operators [GPMAIL]. Koza [Koza92] claims that mutation does not play a large part in finding fit individuals and consequently does not use it in most of his experiments. In contrast studies by Banzhaf et al [BFN99] and Luke and Spector [LS97] show that mutation can be useful in some cases, however they have not discovered any robust heuristics that allow the section of optical settings. Finally, Angeline [Ang97a] puts forward some evidence that crossover may be a form of macro mutation and not play any real role in propagating so called building blocks.

The two main methods of selecting individuals from a generation are fitness proportionate and tournament. When using fitness proportionate, all individuals are ranked according to their absolute fitness values and the best selected. A refinement on this is rank selection [GD01] which reduces the influence of single highly fit individuals.

In tournament selection, n individuals are selected and the best one in the selection is propagated to the next generation. The value of n can be any number greater than one. The winning individual can be left in the donor population, resulting in so called over selection, where it stands a chance of being reselected as a result of further tournaments.

The choice of selection method was based on the work by Banzhaf [Ban93] where tournament selection with over selection performed better in most cases, therefore tournament selection with over selection was used in the work described later.

In order to identify good individuals, a fitness function is required that can provide a measure of how good (or bad) an individual is. Some problems use the result of the program directly as the fitness measure, for example symbolic regression. Other problems use side effects, such as the Ant problem [JCC92] that is commonly used as a benchmark of GP systems. The Ant problem uses a two dimensional toroidal grid containing a trail of food. A simulated ant is placed in this grid. The objective is to discover a controlling program that allows the ant to collect the maximum amount of food in a given time. The ant is able to more forward, turn left or right and sense food in the cell adjacent to the direction it is facing.

It was explained above that the set of functions must satisfy the sufficiency property. That is they must be rich enough to allow an evolving program to be able to satisfy the functional requirements. For instance, a requirement for a program to generate messages would require one or more functions to support this. The functions selected however also depend on the level of abstraction and are dealt with below.

Terminals may be side affecting or yield data. In this case, the functions were chosen to perform all external operations, while the terminals were chosen to yield data. In order to arrive at a sufficient set of data types, it is useful to consider what types of data are commonly encountered in telephony services and these are summarised below.

| Data Type | Comments |
| --- | --- |
| telephone numbers | Strings of digits [0–9#*] that can be dissected and concatenated. The string length may be up to 24. |
| constant integral values | Used for counters and message parameter values |
| boolean values | Flags and status values |
| message types | An enumerated set used to distinguish messages |

From this it is clear that restricting functions and terminals to use a single data type in order to satisfy the closure property is not feasible.

In addition, since most IN services require some state information to be stored between message transfer points, a mechanism for saving state information was required. A first approach to this requirement, Indexed Memory, was suggested by Teller [Tel94] where he argues that in order for GP to be able to evolve any conceivable algorithm, GP needs to be Turing Complete and that addressable memory enables this. A useful side effect of this is that memory also allows state information to be explicitly saved and retrieved.

Of course other approaches to saving state information are possible as for example in the work by Angeline [Ang97b] that uses Multiple Interacting Programs (MIPS). However for the present purposes, Indexed Memory was chosen since it was thought that it would be easier to analyse the operation of the evolving programs.

As already noted above several methods have been proposed to ensure that the closure property is maintained during initial creation and subsequent reproduction. An alternative is proposed in this work, based on polymorphic data types with independent values for each type supported.

This approach was devised as an alternative to the strongly typed methods by making the observation that it is possible that the criteria used to decide what is a correct program has more to do with correctness as seen by a human programmer rather than any inherent property of GP. In other words, strong typing is a necessary artefact of languages used by humans to help ease the burden on the programmer, by means of assisting machine interpretation. Perkis [Per94] has shown that an apparently haphazard mechanism in the form of a stack can yield useful results. Another objection to using a strongly based type system was that the potential number of solutions could be greatly diminished.

A data type termed Autonomous Polymorphic Addressable memory (APAM) was used here and as shown in FIG. 5. This consists of a set of memory locations $M=\{L_1, \ldots L_n\}$ which can be addressed randomly or by name. Each location is a set of data items $L=\{d1, \ldots d_n\}$. The values of $L_n.d_1$, $L_n.d_2$ are independent of each other. Selection of the correct type and therefore value is performed by any function that is passed a memory reference as an argument.

To support this memory architecture, the terminal set T consists of memory nodes $T=\{TVAR1 \ldots TVARn\}$. Each node returns a reference to memory address Ln. and can be passed as arguments to any function.

It should be noted that this is not the same as using a generic data type where a data item is coerced into the correct type at run time. A difficult with coercion is that many automatic conversions are meaningless. For example, in the context of telephony it would be hard to imagine what the coercion of a Boolean value into a telephone number would mean.

The number of functions in C and their arity can be used to estimate the size of the search space as described by [Iba96] and Langdon [Lan97. It is clear that a large function set would result in a large search space, and therefore reduce the probability of achieving good performance. Therefore, a level of abstraction that uses smaller number of functions is desirable.

As an example, consider several sizes for F, assuming each member of F has arity of two, and that there are ten members of T. The population size is calculated using Langdon's method [Lan97] and the results summarised below.

For these experiments, the level was initially pitched at the ICON level since this level allows humans to create production quality services, giving a potential size of F of around twenty. In this work only a small subset of this potential set was chosen. An attempt was made to see if this level of abstraction was optimal by carrying out additional experiments using a level closer to the API. Initial results indicate that using the ICON level may not be the most effective.

The decision was made to measure the fitness of the GP at Interface B (FIG. 1) since this is a standardised external interface [Itu94a] and would allow the specification of services to be performed at the network level.

The Basic Call State Machine (BCSM) of the standards [Itu94a] was simplified, and i.e. called a Simple Call State Model (SCSM) in order to focus on the GP methodology in this description rather than being distracted by the complexities of the BCSM.

By treating the GP as a black box it should be possible to have a high degree of confidence that individuals operate as expected. This would operate by means of sending messages to each individual and waiting for an appropriate response. At the conceptual level this is exactly what is done, but at the practical level things are not so simple.

The initial attempt used this approach, setting a time-out against each response expected, but this resulted in excessive time required to test poor individuals since many time-outs were encountered for highly unfit individuals. It was also very hard to debug such a system.

In order to simplify the system, the execution of the system was driven by the service logic so that when evaluating fitness, the service logic is executed directly. It then makes requests to the SCSM as required. This inversion of roles removes the problems of detecting non-responsive service logic programs, and simplifies the initial debugging and verification.

When running a fitness test, there are two problem specific related measures used to determine how fit an individual is, as well as non-problem specific measures such as parsimony:

The number of correct state transitions made. Each correct transition is rewarded with a value of 100. Each incorrect transition is penalised with a value of −20. The reward and penalty values are summed. Call this value s.

The number of correct parameter values passed back to the SCSM. A correct parameter value is rewarded with a value of 100, and each incorrect value is penalised with a value of −20. The reward and penalty values are summed. Call this value p.

Raw fitness r is given r=s+p.

Normalised fitness n is given by n=k−r where k is a constant that is dependent on the number of state transitions and message parameters in the problem being considered, such that for a 100% fit individual n=0.

A count is maintained of the number of correct and incorrect state transitions and correct and incorrect message parameter values.

Koza [Koza92] p.191 describes a method of measuring the performance of a GP system that consists of running a large number of trials noting for each run, whether the run yielded a correct individual, and the generation number that the run produced such an individual.

For a population size M, the cumulative probability of success P (M, i) for any generation i is calculated. This is a measure of the success of the particular set of configuration settings. From this it is possible to estimate the effort required to find a satisfactory outcome. The cumulative probability P (M, i), is the total number of runs that produced a successful outcome up to and including generation i, divided by the number of runs conducted.

From this, an estimate can be made of the number of independent runs required to reach a satisfactory result with probability z for generation i, using equation 1 ([koz92] p.194):

$$R(z) = \left\lceil \frac{\log(1-z)}{\log(1-P(M,i))} \right\rceil \quad (1)$$

In all cases described z=99%.

The quantities P (M, i) and R (z) are plotted on a graph.

The effort $\epsilon$ required to find a solution by generation i is given for equation 2:

$$\epsilon = M.R(x) \quad (2)$$

Additional information collected includes the total time taken for each run ($\tau$), the number of individuals processed, the number of unique individuals that were 100% fit ($\Psi$), the number of 100% individuals at the final generation ($\upsilon$) and details of the best individual of each run.

A summary of the implementation would be as follows:

(a) The set of functional components and data storage components must be constructed to meet two theoretical constraints; they must be sufficient to be able to construct a program that meets the requirements, and they must satisfy the closure property so that they may be combined in any arbitrary order and still form a program that can be executed. A suitable set of functional components for a number translation service is:

FSTART. Accepts an InitialDP message from the network and decodes the message parameters, placing them in data storage locations.

FDBREAD. Makes a database request using a data storage location for the key, and placing the result of the request in a data location.

FROUTE. Issues a Connect message to the network, using a data location to furnish the destination route address.

STRSUB. Applies a string truncation operation to the contents of a data location.

The data storage components consist of a set of memory cells that can contain one or more data types at the same time.

Both the functional components and data storage components are then encoded as software modules ready for incorporation into the Genetic Programming system.

Figure 1:
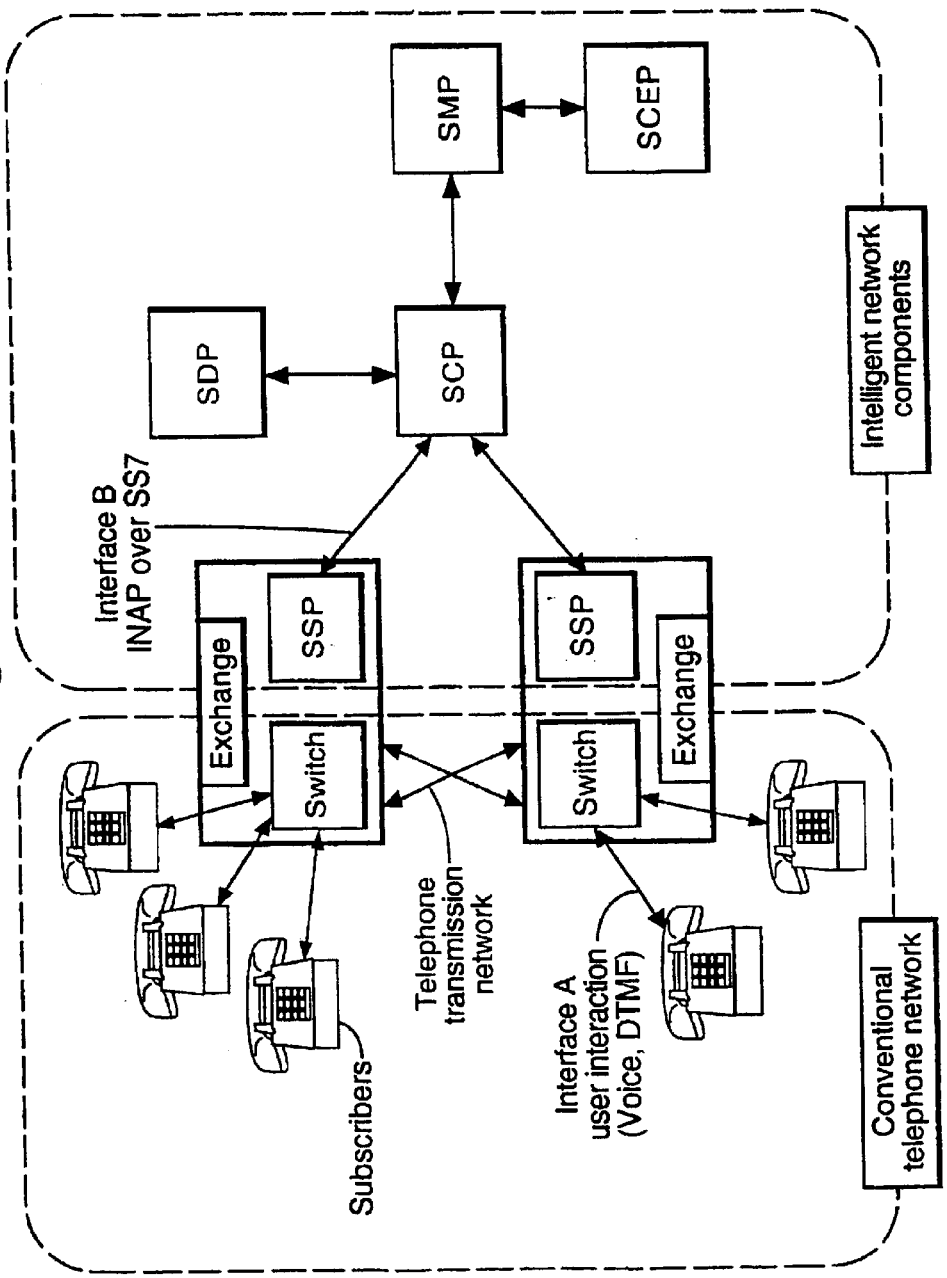
FIG. 1 shows the basic elements of an intelligent network.

(b) An initial representation of the specification of a service is a message sequence chart of which an example is shown in FIG. 1.

Figure 2:
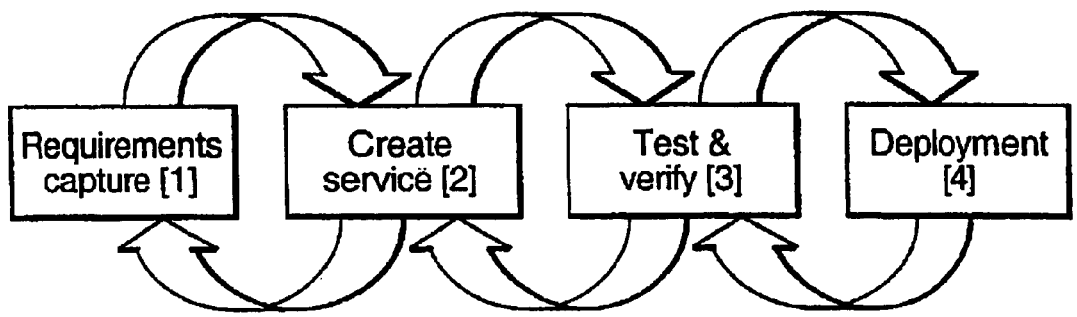
FIG. 2 illustrates a service creation life-cycle.

This is then translated into a state diagram such as is shown in FIG. 2. This specification can then be transformed into a data structure suitable for processing by the Genetic Programming system.

(c) The Genetic Programming system requires a fitness function that evaluates the fitness of individual programs. For service creation, the fitness is the weighted sum of the number of correctly sequenced messages that the SSP sees and the weighted sum of the number of correct message parameters that the SSP sees. Additional evolutionary pressure is imposed to evolve a parsimonious solution.

The fitness function is therefore a simulation of the SSP interface that can send a message to an individual program with data parameters according to the state diagram derived for FIG. 2 and accept messages and inspect message parameters again according to the state diagram. The result of the fitness function is an integral value with smaller numbers representing better fitness.

(d) Given the data structure or structures describing the required service specification, the software modules that encode the functional components and data storage components, and an implementation in the appropriate programming language of the fitness function the Genetic Programming system is then built using new or existing software components.

The system is then run for a pre-determined number of times, using pre-determined generation numbers and population sizes. The system notifies the user of the number of 100% correct individual programs that were generated during the run. The most suitable individual program is then selected for translation into a form suitable for execution on the chosen Intelligent Network platform.

A series of experiments were conducted using a set of increasingly complex service scenarios based on a simple but complete number translation service. Number translation, also popularly known as 'freephone' or 'premium rate' is the most common service offered by IN platforms [Ebe98. Further scenarios look at how error conditions and decisions can be handled within the evolving service.

This shows how the present invention may be implemented.

A number of simplifying assumptions were made at the start:

the number of functions present in the function set was limited in order to concentrate on the essential requirements of services.

the external world is implemented such that the SDP is integrated with the SCSM to ease the job of the fitness evaluation function. In the real world the two would be separate functions.

the number of parameters passed in the messages was limited in order to ease the implementation of the fitness function.

The system supports five message types analogous to the real world Intelligent Network Application Part (INAP) and SDP operations. These are summarised below.

| Message type | Equivalent INAP/SDF message | Parameters | Comments |
| --- | --- | --- | --- |
| IDP | InitialDP | CalledDN and flag | The message is generated by the SSP as a result of a trigger detection point being activated by a call. |
| DREQ | DB_REQUEST | Key | A database request. |
| DBRESP | DB_RESPONSE | Result and status of request | The response from the database. |

-continued

| Message type | Equivalent INAP/SDF message | Parameters | Comments |
| --- | --- | --- | --- |
| CONNECT | Connect | Translated Address | An instruction from the SCF to the SSP to connect party A to party B. |
| END | Pre-arranged end | None | A message issued by either end of a TCAP link to terminate an active session |

The function set F selected for the initial set of experiments consists of five functions: FSTART, FROUTE, FDBREAD, FEND and STRSUB.

FSTART takes two arguments. The first argument is evaluated, and the parameter value passed in a DBREQ message sent to the SCSM. It then accepts a DBRESP message and the second argument is evaluated, and the parameter value from the message is stored at the location returned. Finally, the third argument is evaluated and returned. DB_REQUEST and DB_RESPONSE are proprietary messages used by GPT Limited for SCF to SDF conmmunication.

FROUTE takes two arguments. The first argument is evaluated and the parameter value used in the Connect message sent to SCSM. The second argument is then evaluated and returned.

FEND takes one argument, which is evaluated and returned. An END message is sent to SCSM.

STRSUB was included because real life services require digit string manipulations. It takes two arguments, which are both evaluated. The string value from the first argument is shifted left by one character and stored at the location returned by the second argument.

The result of the second argument is returned.

Figure 6:
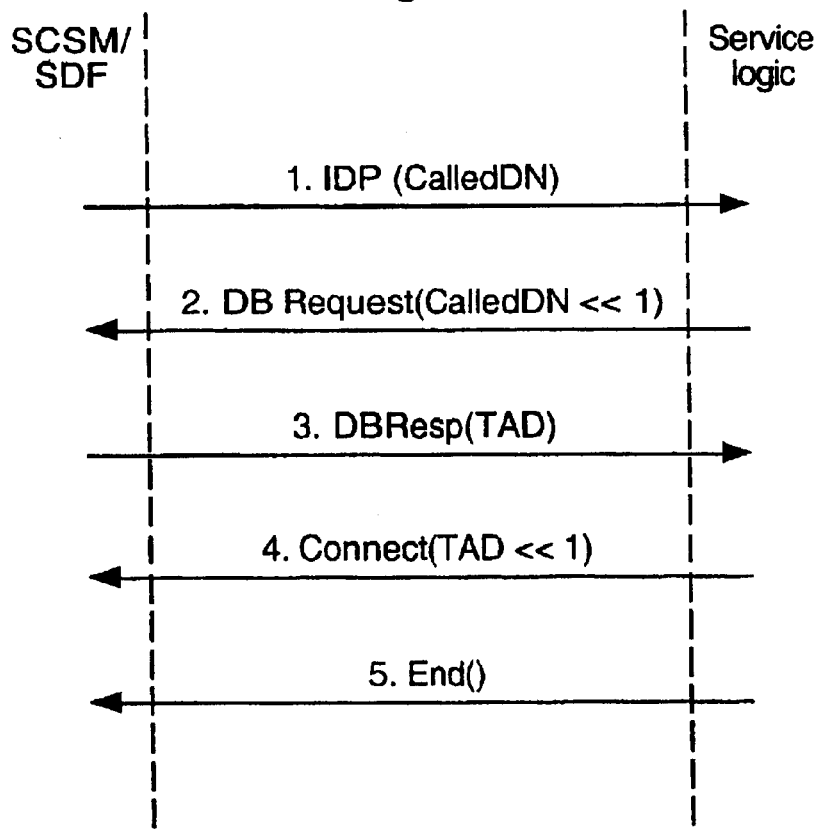
FIG. 6 shows a message sequence chart for a simple number translation service.

A simple translation service is required to translate an incoming number to a new number. Typically this is done by means of using the incoming number (CalledDN) as a key to read the new number from a database, and to issue a connection command to the SSP with the translated address (TAD). A message sequence chart for this service is shown in FIG. 6.

The external operation of this service as follows:
1. The SSP sends an initial trigger message called the Initial Detection Point (IDP) containing the number (CalledDN) dialled by the user (the A party).
2. The service logic makes a request to the SDF to get the real number to route the call to.
3. The SDF returns the number (TAD) to the service logic.
4. The service logic sends a Connect message to the SSP, causing it to route the caller (A party) to the correct number (B party).
5. The SCP sends an END message to the SSP indicating that the service logic has relinquished control of the call and is no longer concerned with any events generated by the SSP as a result of the call progressing.

Note: CalledDN <<1 denotes that the CalledDN string is shifted left by one character, discarding the 1$^{st}$ character. This is used to simulate the real world operational requirement to modify the digit string in some way, for instance to strip any leading zeros from a national number.

Figure 7:
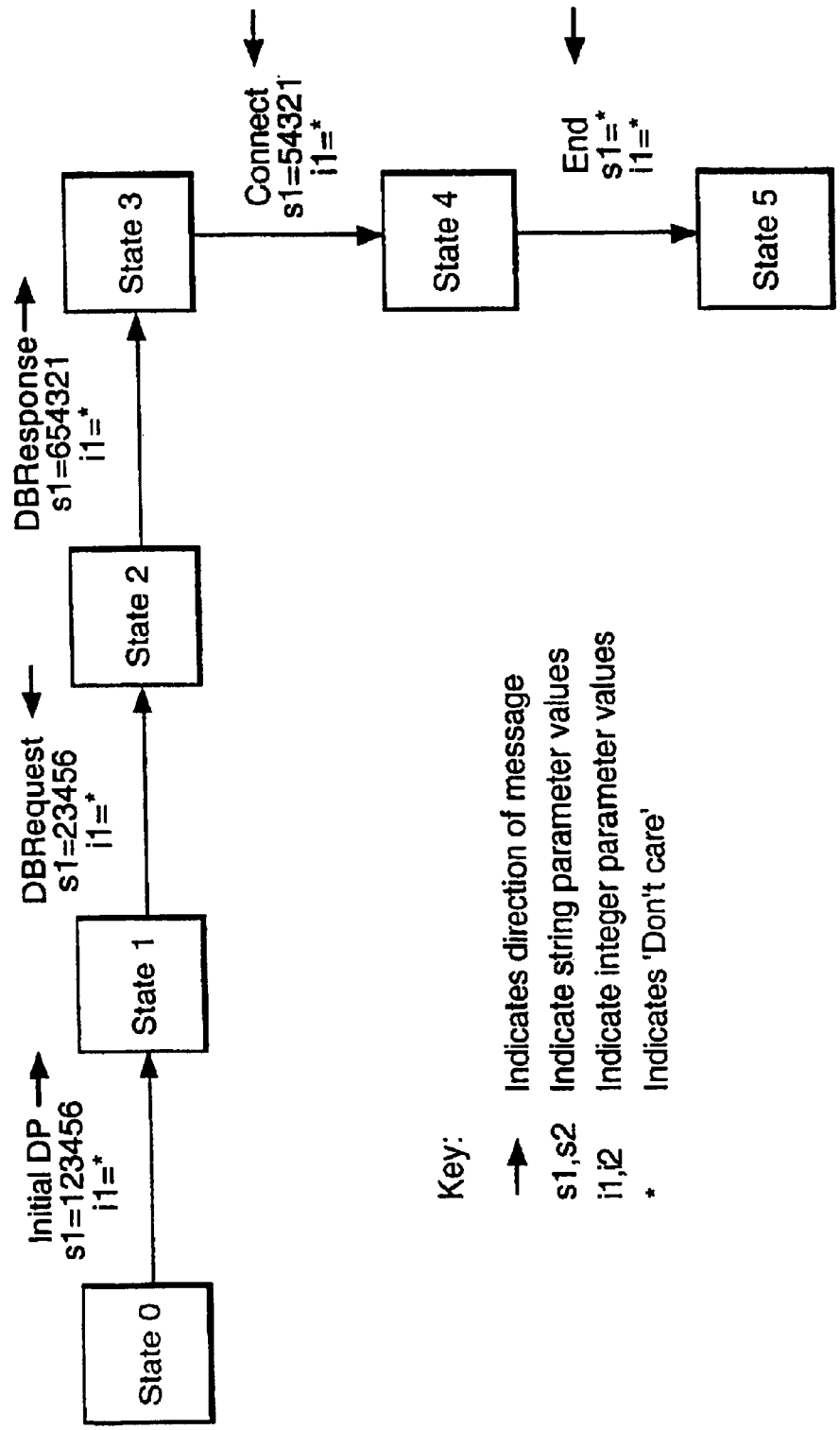
FIG. 7 shows a state diagram for a simple number translation service.

From the message sequence chart an external state model can be derived as shown in FIG. 7.

This experiment was evaluated using a range of populations between fifty and five hundred to determine the behaviour for different population sizes. Fifty independent runs were made for each population, and the total number of successful outcomes for each generation was recorded.

Each run was allowed to complete to generation 200, irrespective of whether it had found a 100% fit individual.

The results are shown below. A good run is where a 100% fit individual was produced or formally where $P(M,200)>0$.

| Population M | Number of good runs | Time τ (secs) |
| --- | --- | --- |
| 50 | 12 | 105 |
| 100 | 22 | 326 |
| 150 | 35 | 476 |
| 200 | 42 | 783 |
| 250 | 42 | 971 |
| 300 | 49 | 1159 |
| 350 | 48 | 1382 |
| 400 | 50 | 1749 |
| 450 | 48 | 1937 |
| 500 | 50 | 2140 |

Two points can be deduced from these results. Firstly, even for small population sizes, a significant number of successful and therefore useful programs were generated. Secondly, the running time is roughly proportional to the population size.

Figure 8:
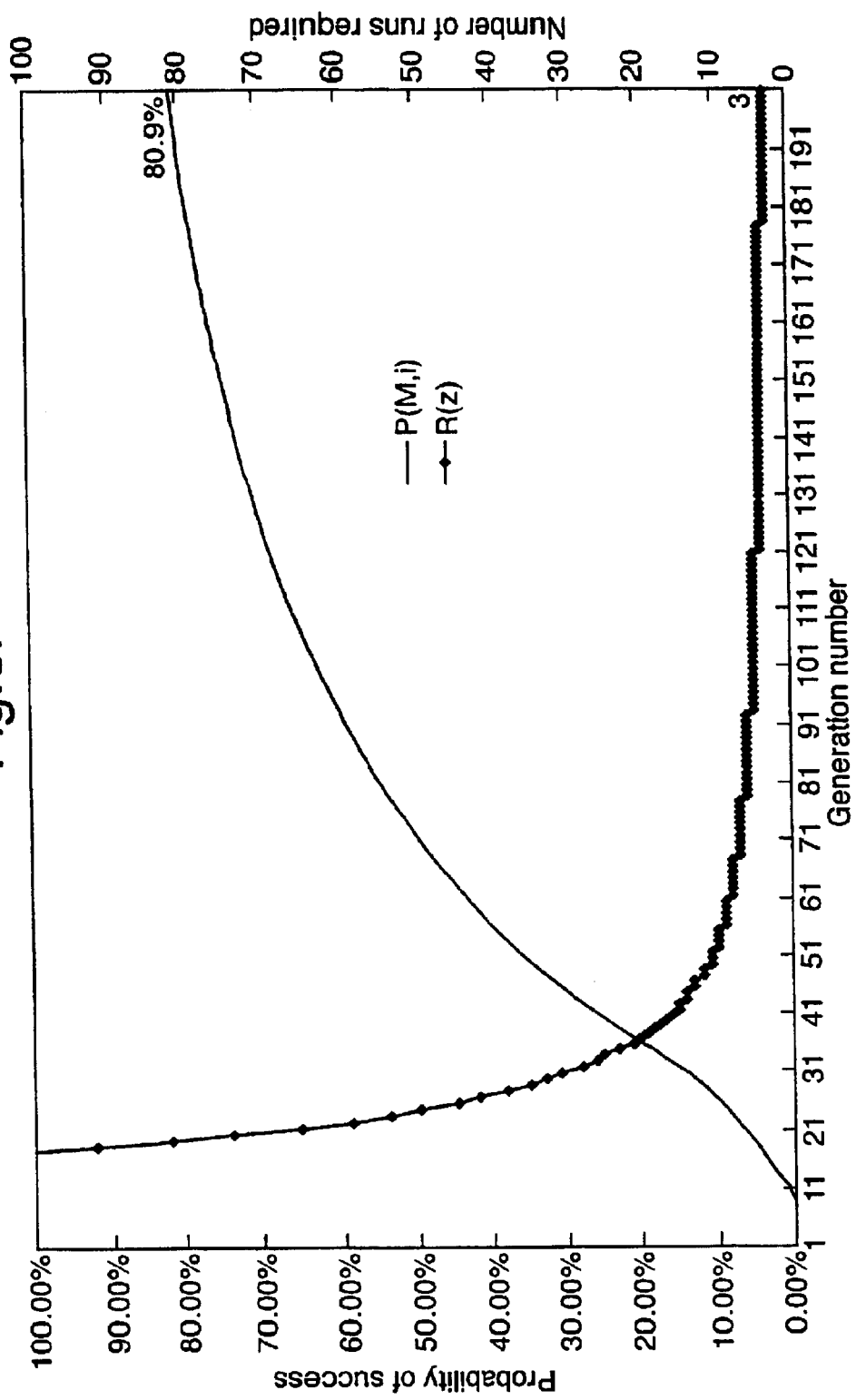
FIG. 8 shows the performance of a simple number translation for m=500.

The raw data was then processed to show the probabilities of success and the number of independent runs required. This is shown graphically in FIG. 8 for a population size M of 500. Note that R(z) is proportional to the effort required from equation (2).

Since for a population of 500, there was an 80% probability of success, this population size was used subsequently.

| Effort ε | Number successful at generation 200 ϑ | Number of different 100 % fit programs |
| --- | --- | --- |
| 1,500 | 50 | 50 |

Complex number translation was now considered where there is an additional database request, and additional variable manipulation requirements. This scenario occurs in the real world where a service requires two items of data in order to route a call. For example, a service may need to route to one number during working hours and another number during out of work hours. The first database request in this example represents the query that determines a time based key for the subsequent request. Again a message sequence chart and state diagram are shown in FIG. 9 and FIG. 10.

The performance of this experiment is shown graphically in FIG. 11 and a summary of the performance is shown below.

| Effort ε | Number successful at generation 200 ϑ | Number of different 100% fit programs φ |
| --- | --- | --- |
| 2,000 | 49 | 49 |

The main conclusion that can be drawn from the above is that in comparison with the simple case, more processing effort was required.

Figure 12:
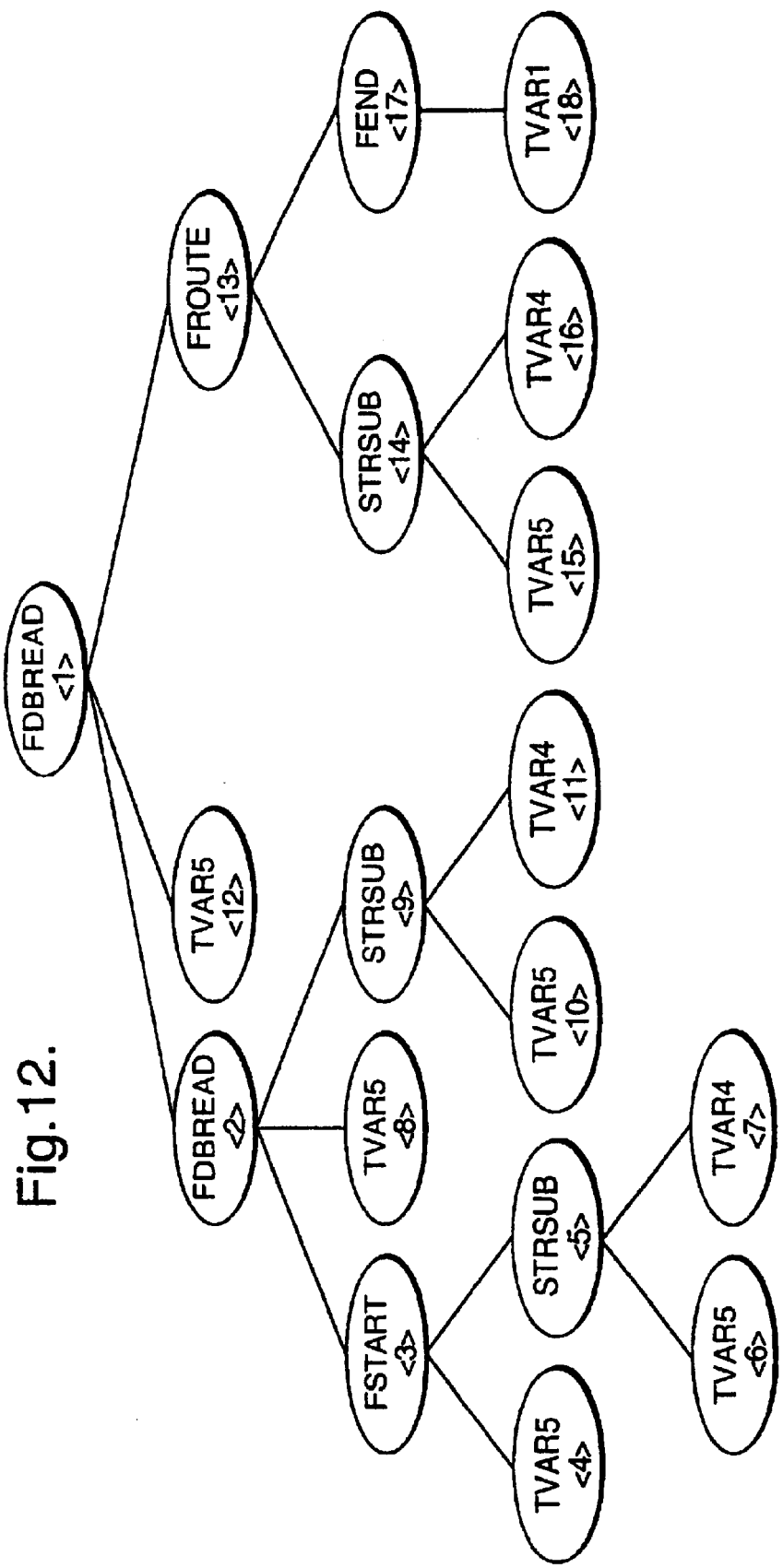
FIG. 12 shows an example of a program tree for complex number translation −1.
Figure 13:
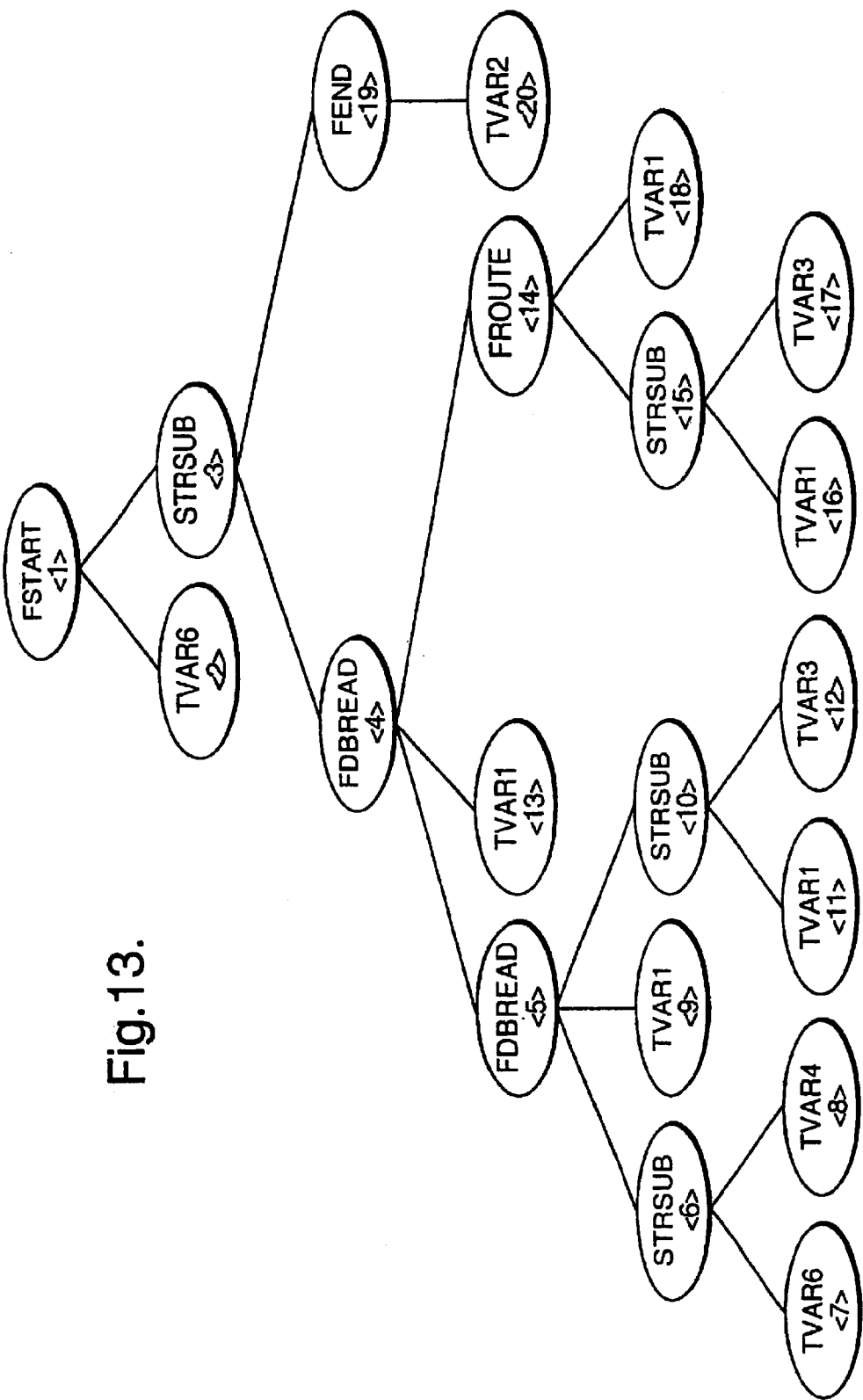
FIG. 13 shows an example of a program tree for complex number translation −2.
Figure 14:
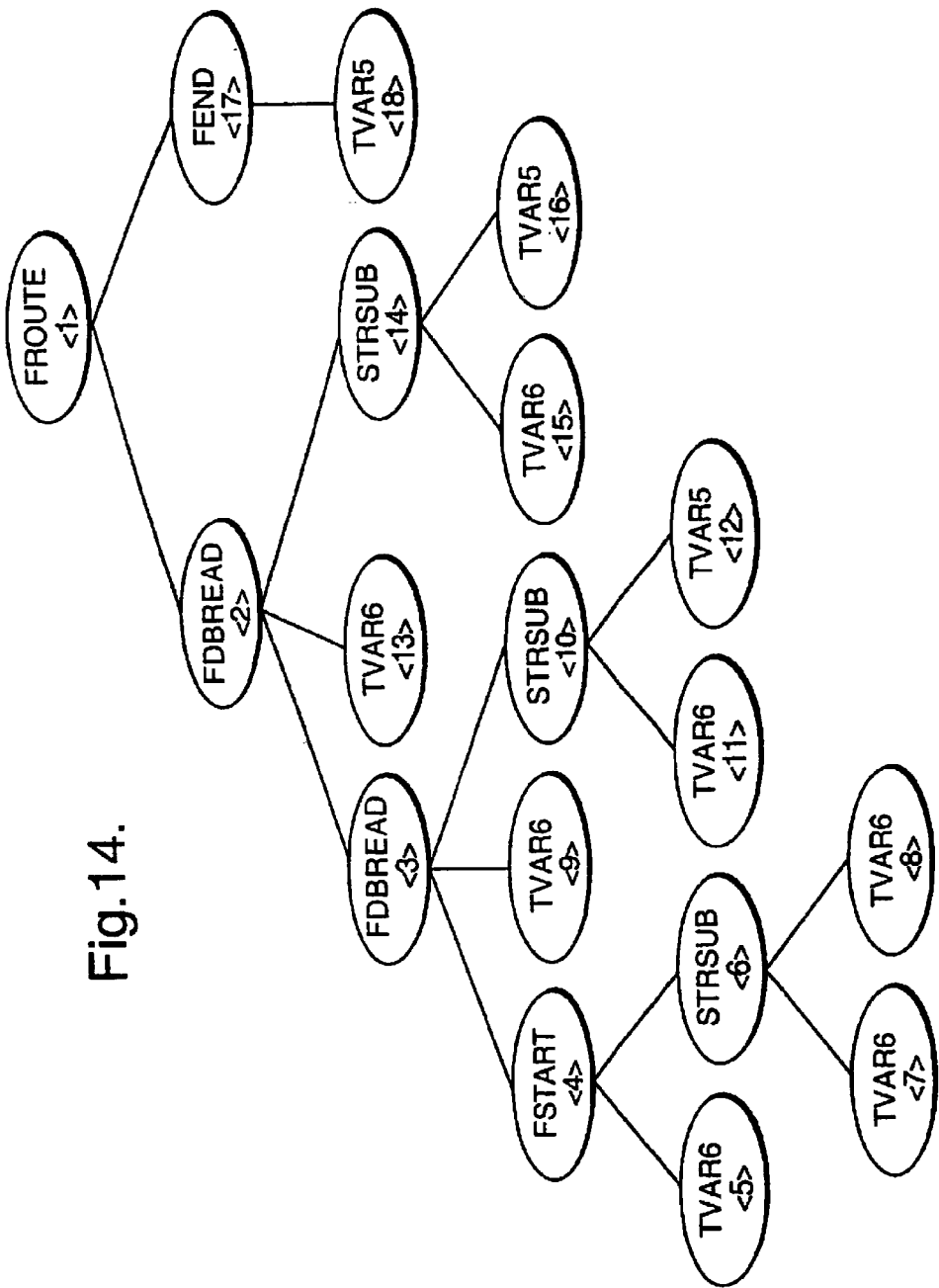
FIG. 14 shows an example of a program tree for complex number translation −3.

Some sample 100% correct programs from this experiment are shown in FIGS. 12, 13 and 14, taken from the run when M=500, from runs 1, 9 and 13.

From these three examples, the potential variety of solutions that appear can be seen. It is possible that a human programmer would have come up with that shown in FIG. 13, since this begins with the FSTART operation, followed in sequence by the other operations, although using the side effect of node 5 is not intuitive. It is unlikely that a human would have started with the FROUTE operation. The variety can also be seen from the fact that the 49 successful runs produced 49 different solutions.

It is also interesting to note the presence of unproductive nodes. For instance, in FIG. 14, node <10> performs an STRSUB between TVAR5 and TVAR6. TVAR5 is not used again, until it is overwritten with the result of a shift at node 14, therefore node <10> is a redundant non result affecting node.

The presence of these unproductive nodes—called introns—is part of the evolutionary process. It has been argued by Nordin [NFB96] that the presence of introns can help the evolutionary process by isolating productive sequences from other sequences, and thus preserving them for future generations. The presence of these introns can be seen by observing the change in population size of totally fit individual while running the GP system.

Figure 15:
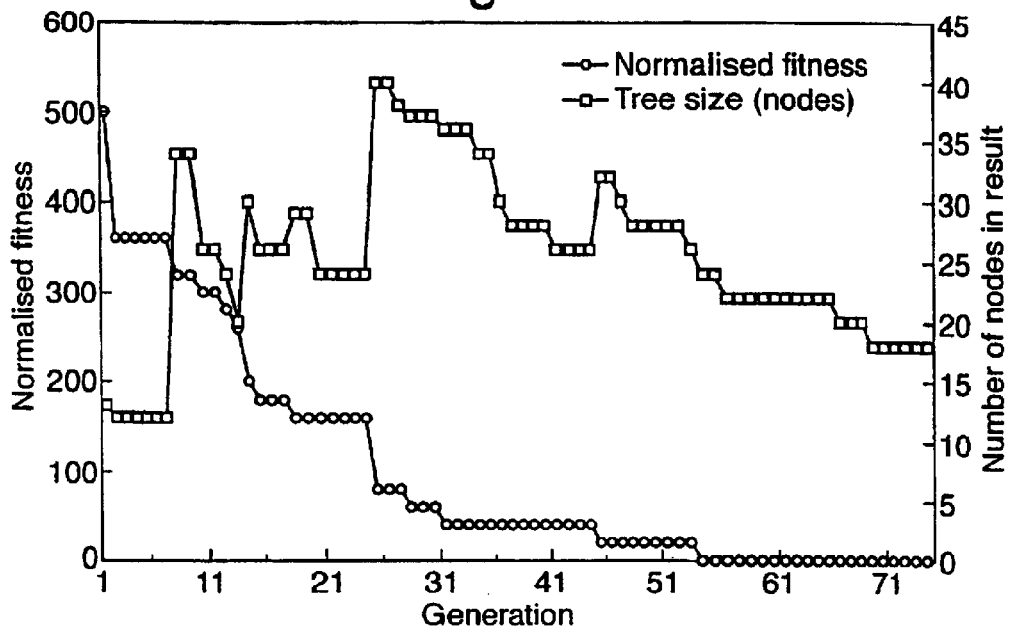
FIG. 15 illustrates the size of fittest individual with generation.

The presence of introns during evolution is shown in FIG. 15 for M=500, run number 24. The plot shows the normalised fitness and tree size of the fittest individual for each generation. It is important to note that this does not shown any one particular individual throughout the run.

As the fitness improved, the size of the fittest individual tended to increase initially presumably due to the effects of crossover introducing new material to the fittest individual, or due to other fitter individuals being produced. It can also been seen that the size increased at the same point that an improvement was made to the fittest individual. However additional pressure to evolve parsimonious individuals resulted in each stable case decreasing in size. This is true even for the 100% fit individual the appeared at generation 53.

The problem presented here has two distinct measures for fitness:
1. Whether states are handled correctly.
2. Whether the message values returned from the program are correct.

It is interesting to observe the rates at which the system can find totally fit solutions. To do this, the number of successful and unsuccessful state transitions and messages was recorded by the SCSM for each generation.

Figure 16:
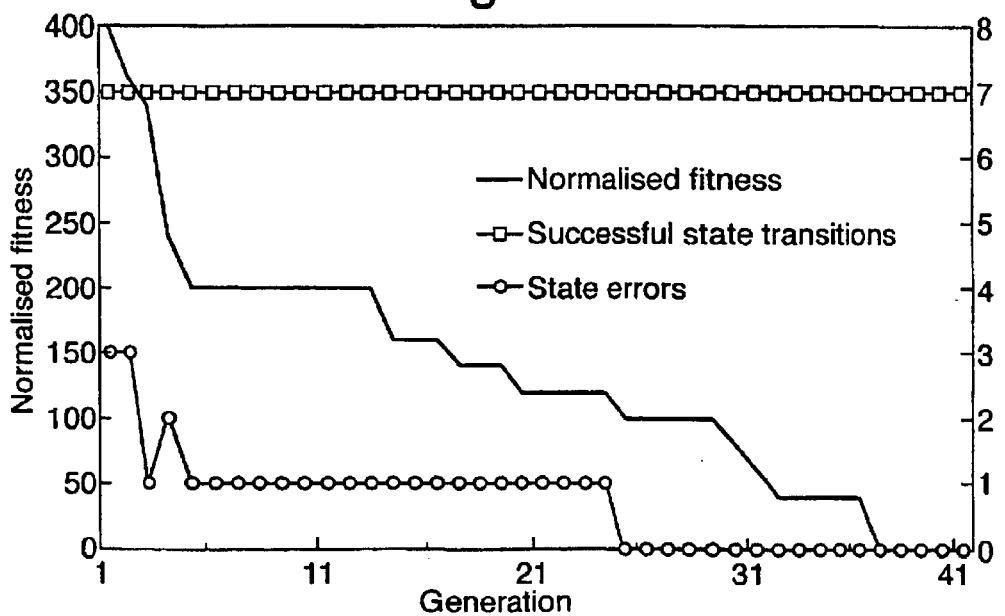
FIG. 16 shows the progression of state fitness evolution.
Figure 17:
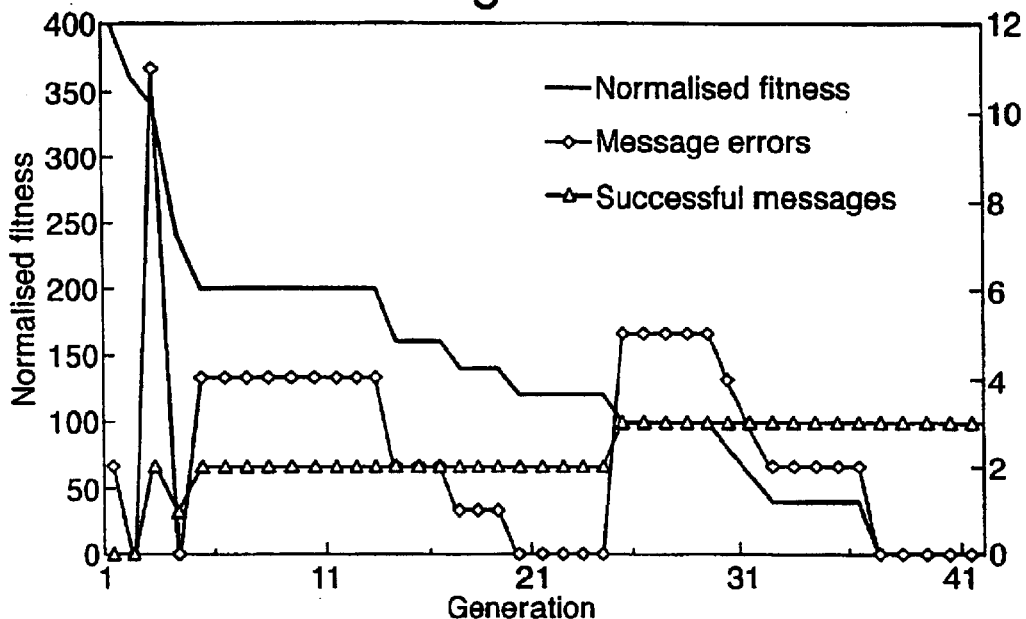
FIG. 17 shows the progression of message fitness evolution.

FIG. 16 shows the progression of the states for M=500, run number 19, and FIG. 17 shows the message fitness progression.

This shows that the state handling is quickly evolved, with 100% of the states correctly handled by the fist generation. However, there are still a number of extra incorrect states present until generation 25. This can be attributed to the fact that bad states incur a penalty of 20, while good states are rewarded with a value of 100.

By comparing FIG. 16 and FIG. 17 it can be seen that message fitness lags behind the state fitness. This is because a correct message cannot be delivered until the correct state handler is in place.

The implication of this behaviour is that if there are fitness measures (as in message parameter values) that are completely dependent on other fitness measures (such as the message ordering), the effort required to evolve solutions increases. There is therefore effectively a hierarchy of fitness and there is expected to be a practical limit to the depth of such a hierarchy.

Experiment 3. Run-time Decision Making—Simple Case

The cases studied so far require a linear sequence of message exchanges and the correct data passed with those messages, but in real life systems exceptions occur which must be handled. Additionally, services often make decisions based on the current state, user inputs, database values or environmental factors such as the time or date.

This experiment was designed to discover if logic could evolve to handle these cases.

The simple case requires the service logic to return one of two numbers depending on the value of a flag that is passed into the service from the SSP. Such a flag may indicate that a particular caller is denied access to parts of a service.

Figure 18:
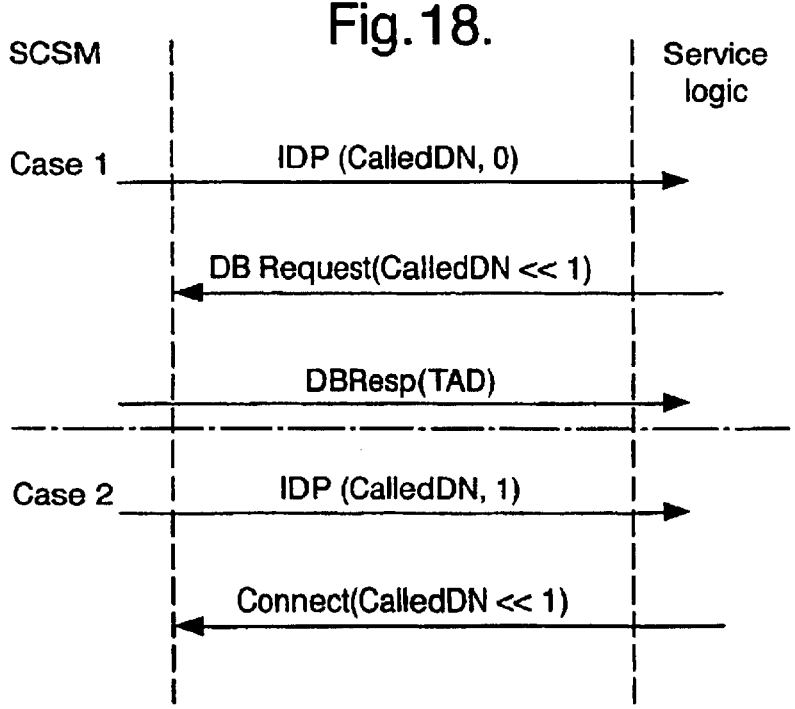
FIG. 18 shows the message sequence.
Figure 19:
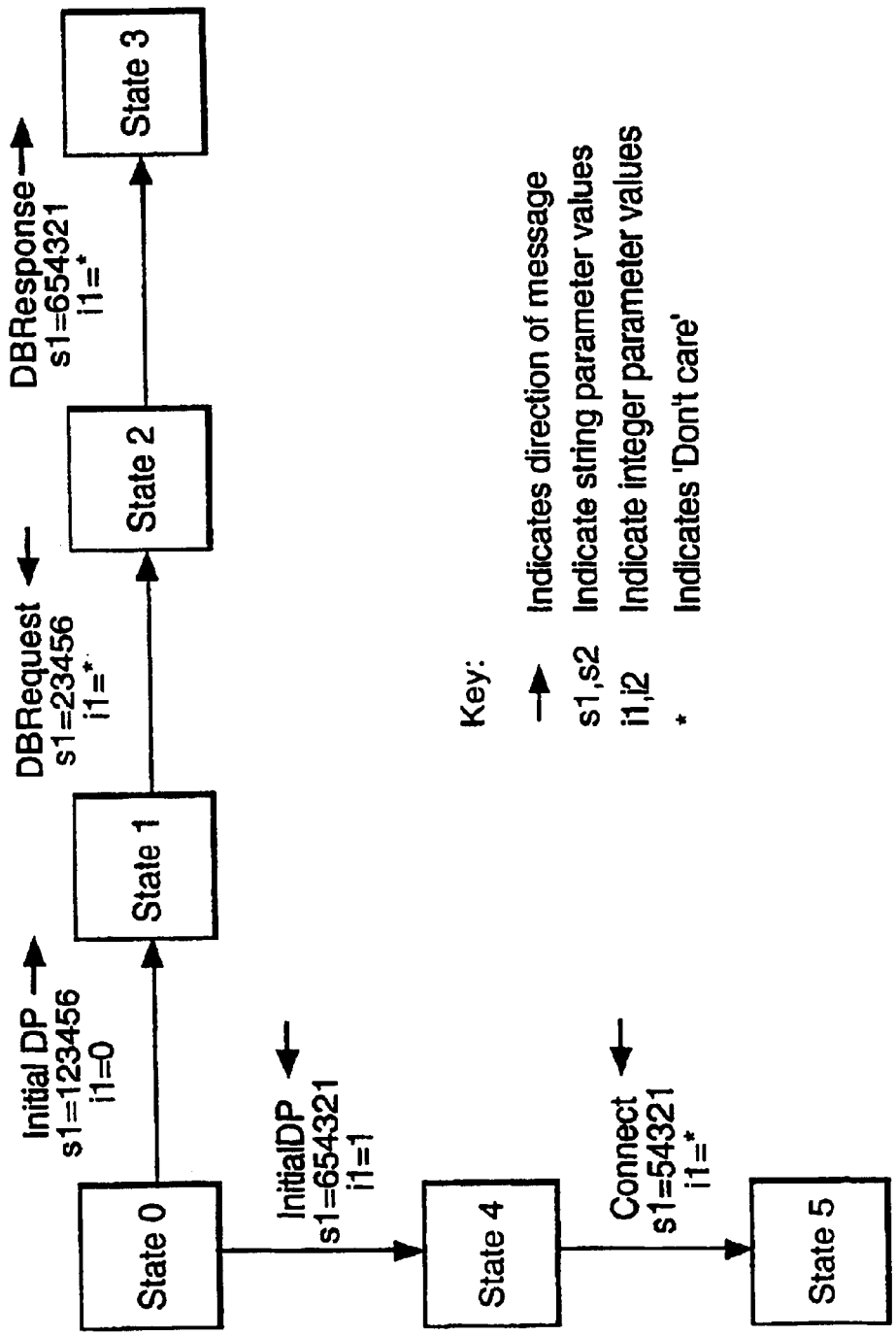
FIG. 19 shows the state diagram.

The message sequence is shown in FIG. 18 and the state diagram in FIG. 19.

To handle run-time decisions, two changes are required to the system previously described:
1. The fitness function must expose the GP to all the cases.
2. An addition test function needs to be added to the existing function set.

Two methods of modelling this behaviour suggest themselves. Firstly, a probabilistic or sampling model that only subjects each individual to a subset of possible sequences. Secondly, a deterministic approach that model the complete set of behaviour required by any correct solution.

The probabilistic method requires only a single fitness run for each individual, the fitness case being selected on a weighted random basis from all possible fitness cases. The obvious attraction is that the number of fitness tests could be less than the deterministic method. However, there are several difficulties with this method. Firstly there is danger of losing useful genetic material and finding a poor local minimum if an individual should score poorly for the normal case, but in fact contain a good solution for the error case. Secondly, if the error cases are only evaluated on average according to their probability of occurring, then the error cases will not have as much exposure to the normal evolutionary effects as the normal case. If this were to happen, then the normal cases would likely at a rate similar to the single case, while the error cases would require additional computational effort to yield a highly fit individual.

The third party is more fundamental in that to identify 100% fit individuals, all paths must be traversed at some point. If this is done for each generation then this degenerates into the deterministic method described next, or it must be done at prescribed points, for instance after a given number of generations. The question then arises as to what the real fitness criteria is. Is it the partial result from probabilistically selecting a subset of all paths, or is it the complete set of path traversals?

Because of this fundamental problem, this approach was not pursued any further. An alternative is suggested by Gathercole [GR94] and [GR97] in adaptively modifying how many fitness cases should be used with a technique called Dynamic Subset Selection (DSS).

When considering the alternative deterministic method we are concerned with achieving a full coverage of all possible sequences of events and messages. This would ensure that all cases have an equal chance of evolving correctly. The major disadvantage, at least for large problems, is the time required to fully evaluate each case, since each individual must be subjected to all possible cases.

The number of fitness tests is proportional to the number of paths in the problem N. If all possible paths are the same length, then the net result on the time required to find a solution would be at least N times the time required for the case where a single thread of control existed. The real problem is that the number of paths is likely to increase exponentially in the number of nodes that must handle error cases.

The number of paths has been restricted to two.

The new function added to the function set F is the equality test FEQ. This takes three arguments and operates as follows:

The first argument is evaluated and if the integer portion of the result is equal to 1, then the second argument is evaluated, else the third argument is evaluated. The result of the final argument evaluated is returned.

Figure 20:
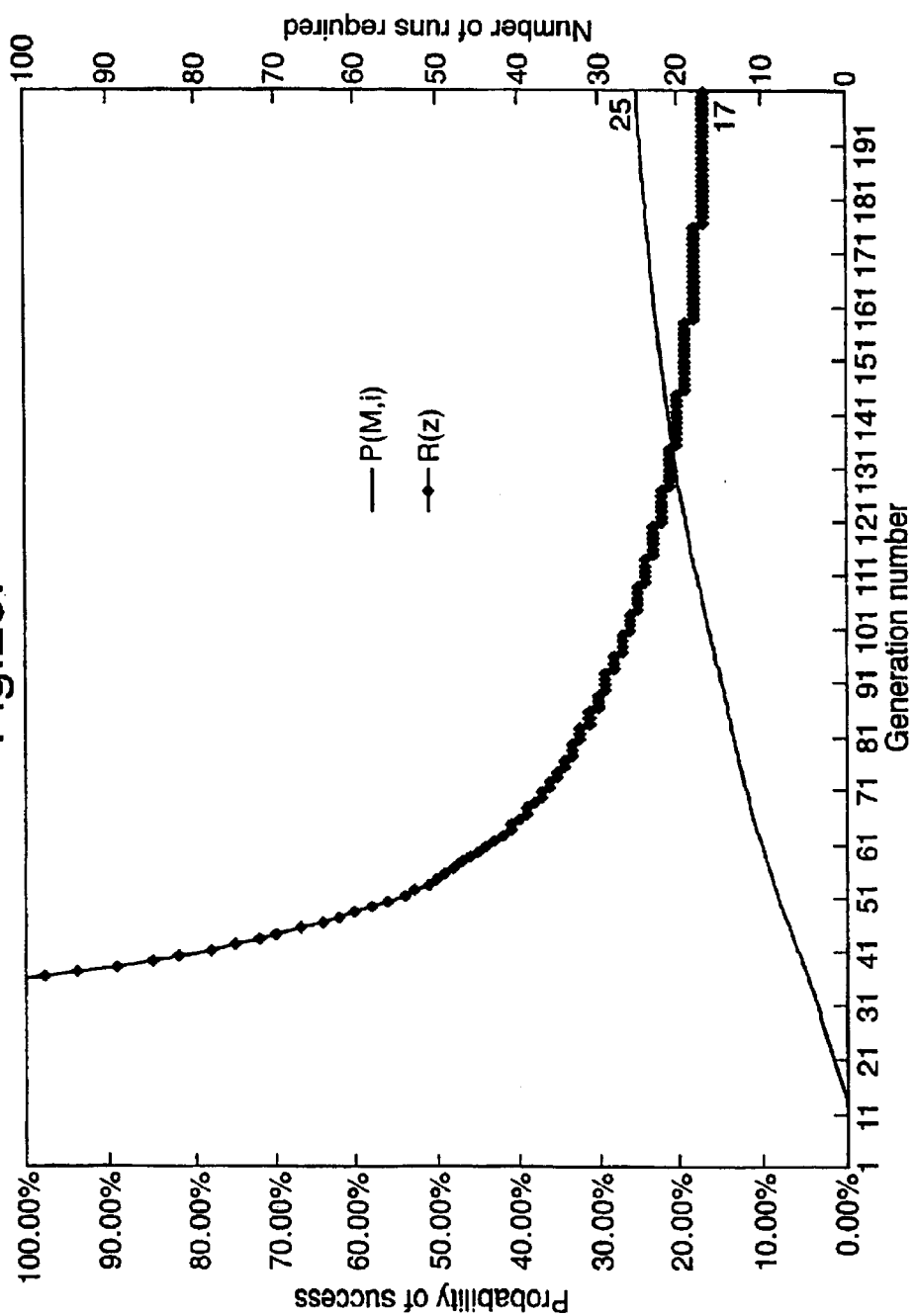
FIG. 20 shows the performance of early decision making for m=500.

The performance results are shown in FIG. 20.

| Effort $\epsilon$ | Number successful at generation $\vartheta$ | Number of different 100% fit programs $\vartheta$ |
|---|---|---|
| 8,500 | 17 | 17 |

Experiment 4. Run-time Decision Making—More Complex Case

The previous case involved the service in making a decision early in its execution tree. This case involves making a decision later in the tree where, for instance, the database cannot find a record corresponding to the key. Other failures such as an internal database error or a communication failure are also covered by this example. The decision point was moved to see what effect on the evolutionary process was of delaying the point at which the branch was required.

The response from the database contains an additional parameter, in this case used to indicate success or failure. It is an integer value that takes the value 0 indicating normal operation, or 1 indicating an error condition. The error condition results in the value returned by the error response being sent as the translated address.

This case uses the same function set as previously, and uses the full coverage (deterministic) method of fitness evaluation.

The summary is shown in the table below.

Figures 21, 26:
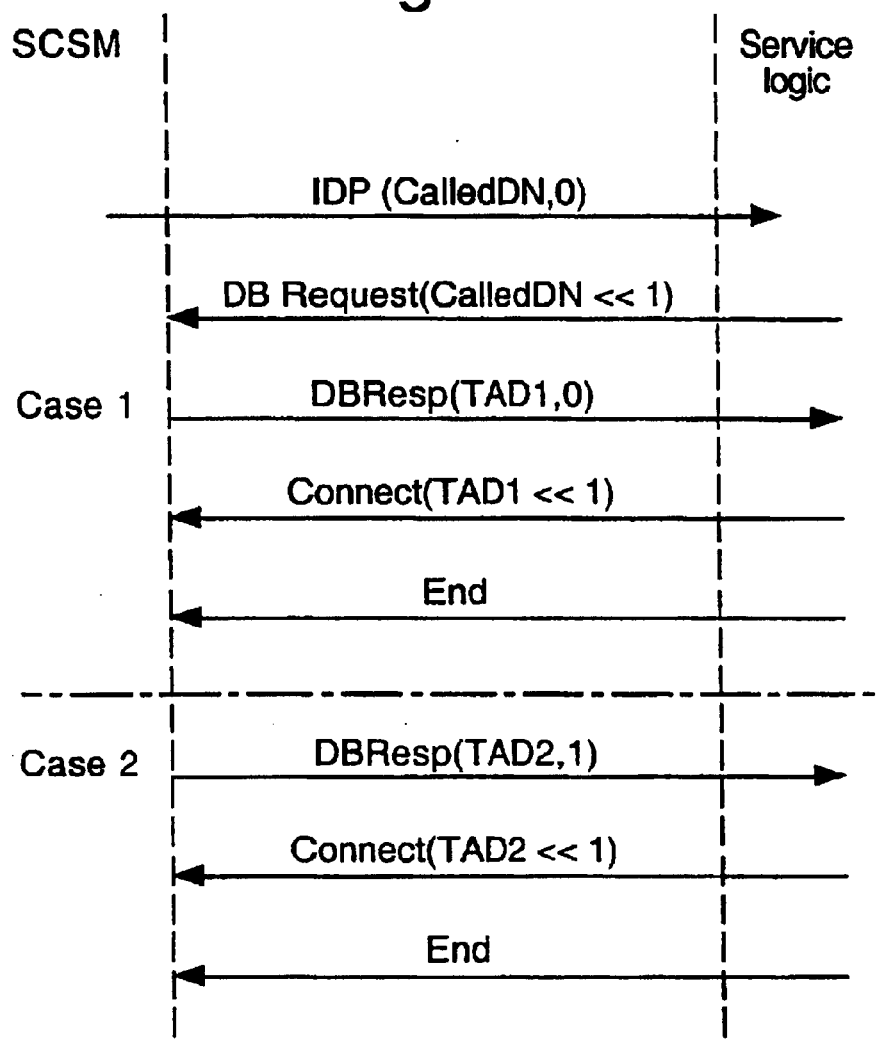
FIG. 21 shows a message sequence chart for late decision experiments.
FIG. 26 shows a simple 'C' program.
Figure 22:
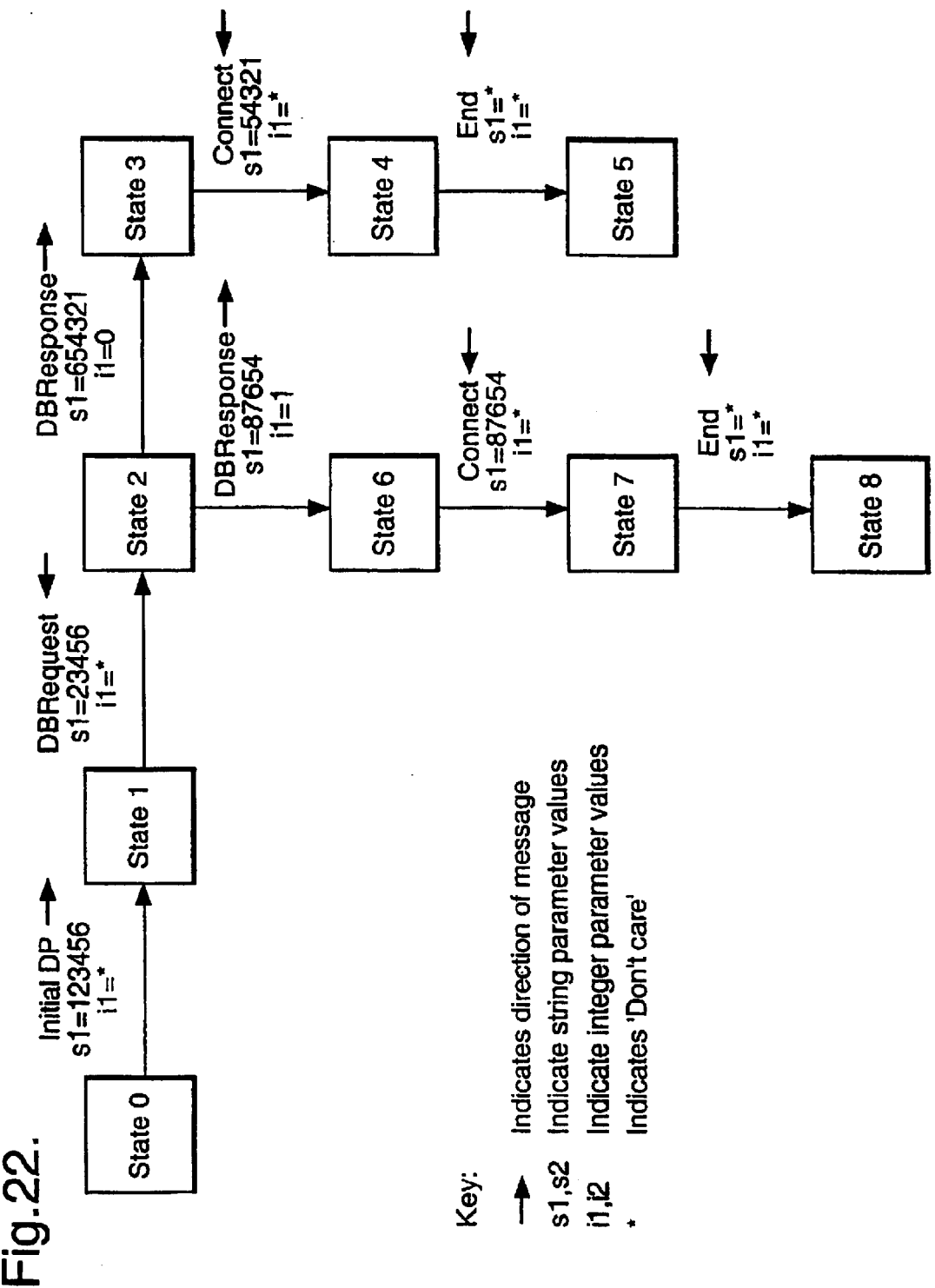
FIG. 22 shows a state diagram for late decision experiment.
Figure 23:
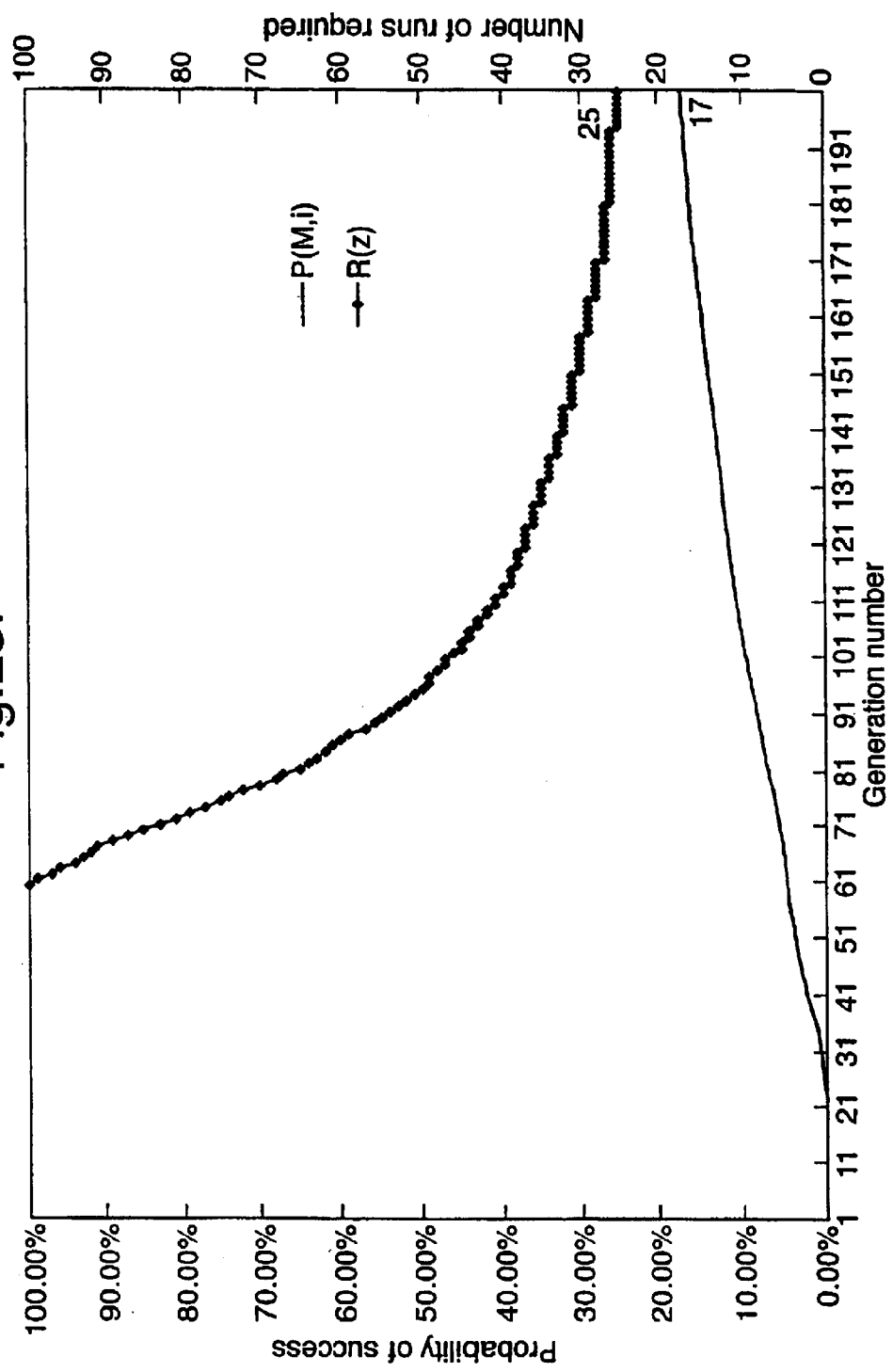
FIG. 23 shows the performance of late decision making for m=500.

The message sequence chart is shown in FIG. 21, the state diagram in FIG. 22 and the performance in FIG. 23.

| Effort $\epsilon$ | Number successful at generation 200 $\vartheta$ | Number of different 100% fit programs $\vartheta$ |
|---|---|---|
| 12,500 | 11 | 11 |

The graph clearly shows the inferior performance of this experiment using the standard value of M=500, the effort being much greater than 2*$\epsilon$ for experiment 1. Obviously other factors come into play when trying to evolve such a program.

Experiment 5. Reduced Complexity Function Set

Earlier the choice of function set was discussed. This experiment was devised to give an indication of whether the original level of abstraction was reasonable or whether by using a lower level of abstraction in the function set better performance could be achieved. A literature search failed to find any detailed discussion of this aspect of GP. Most problems discussed in the literature deal in small problems whose function and terminal set are fairly obvious.

The input for this experiment is identical to that described in section 5.3. This case was chosen since it was the first experiment that had a value of $\upsilon$ of <50 and was therefore seen as not trivial.

The high level functions FSTART, FDBREAD, FROUTE and FEND were removed and two new functions ReadMSG and SendMSG were added.

ReadMSG accepts an incoming message and places the parameters into memory locations as provided by the arguments to this function. In this case, only one parameter is accepted.

SendMSG constructs a message containing a message type and a single parameter value.

Earlier it was indicated that the lower the level of abstraction the more functions would be needed. The fact that there are two fewer functions for this experiment compared to Experiment 2 is explained by the fact that the higher level functions FSTART etc are synthesised from these lower level functions.

Lastly, the memory cells were extended to contain a message type, enumerated over the range of message types required.

Figure 24:
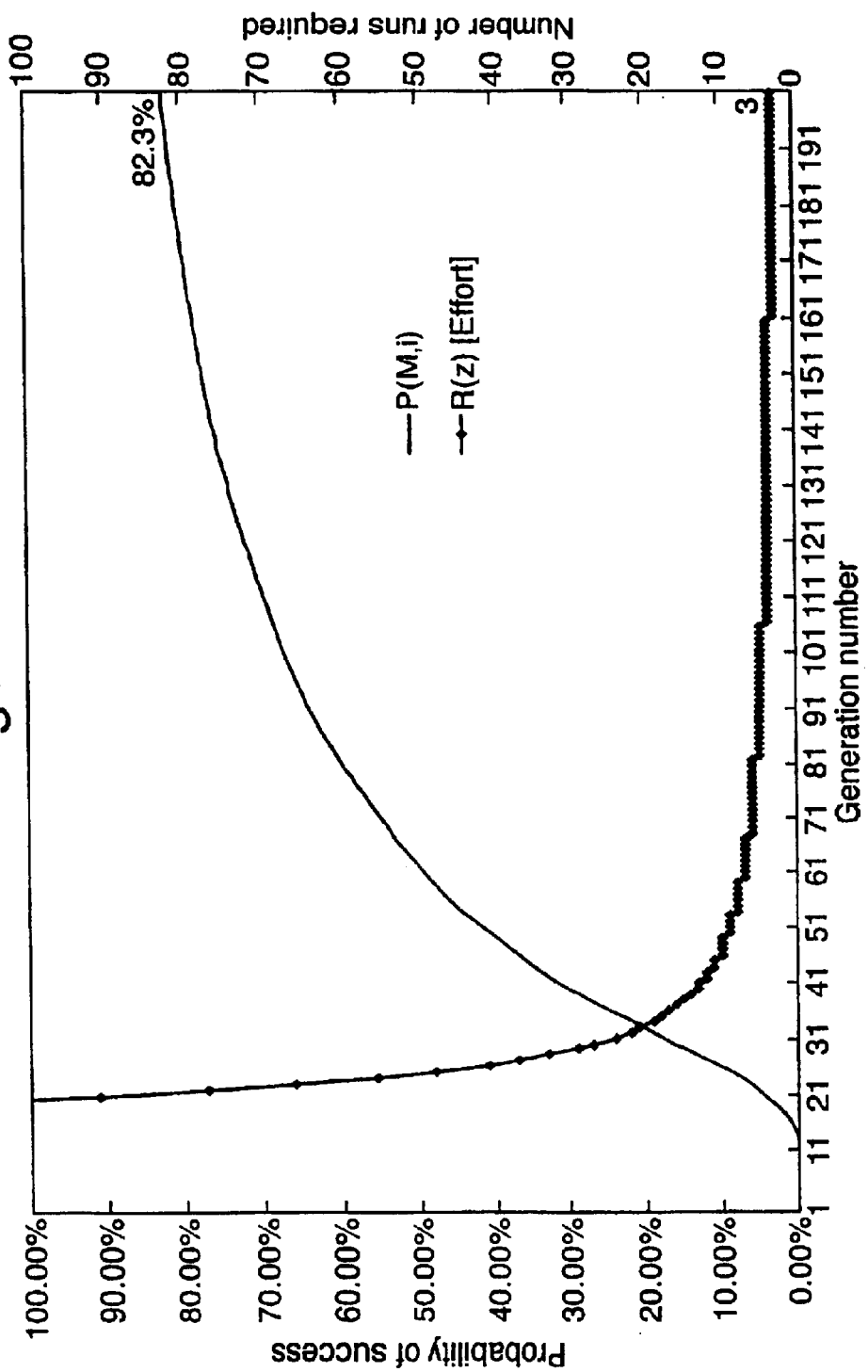
FIG. 24 shows the performance using reduced complexity functions for m=500.

The overall performance of the system when using lower level functions is shown in FIG. 24 and a summary of performance is shown below.

| Effort $\epsilon$ | Number successful at generation 200 $\vartheta$ | Number of different 100% fit programs $\psi$ |
|---|---|---|
| 1,500 | 49 | 49 |

Figure 11:
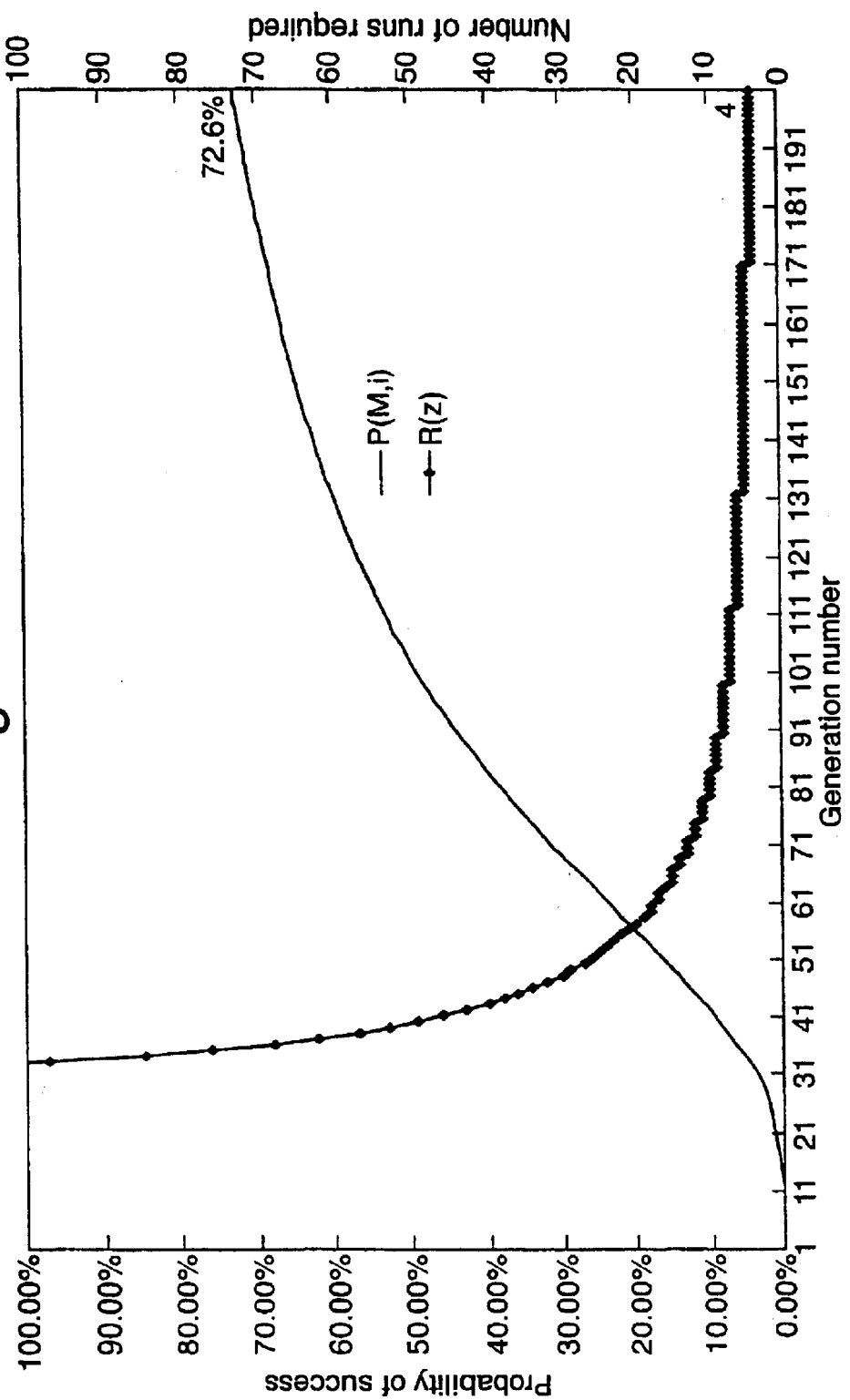
FIG. 11 shows the performance of complex number translation for m=500.

It is interesting to note the performance in comparison to that using higher level functions in FIG. 11. The effort curve R(z) reaches the value 10 at an earlier point and the probability curve is also steeper. The disadvantage of this method though is the more CPU time required to process each run. This is shown in Table 12 and may be an important factor when considering the scalability of GP.

Figure 25:
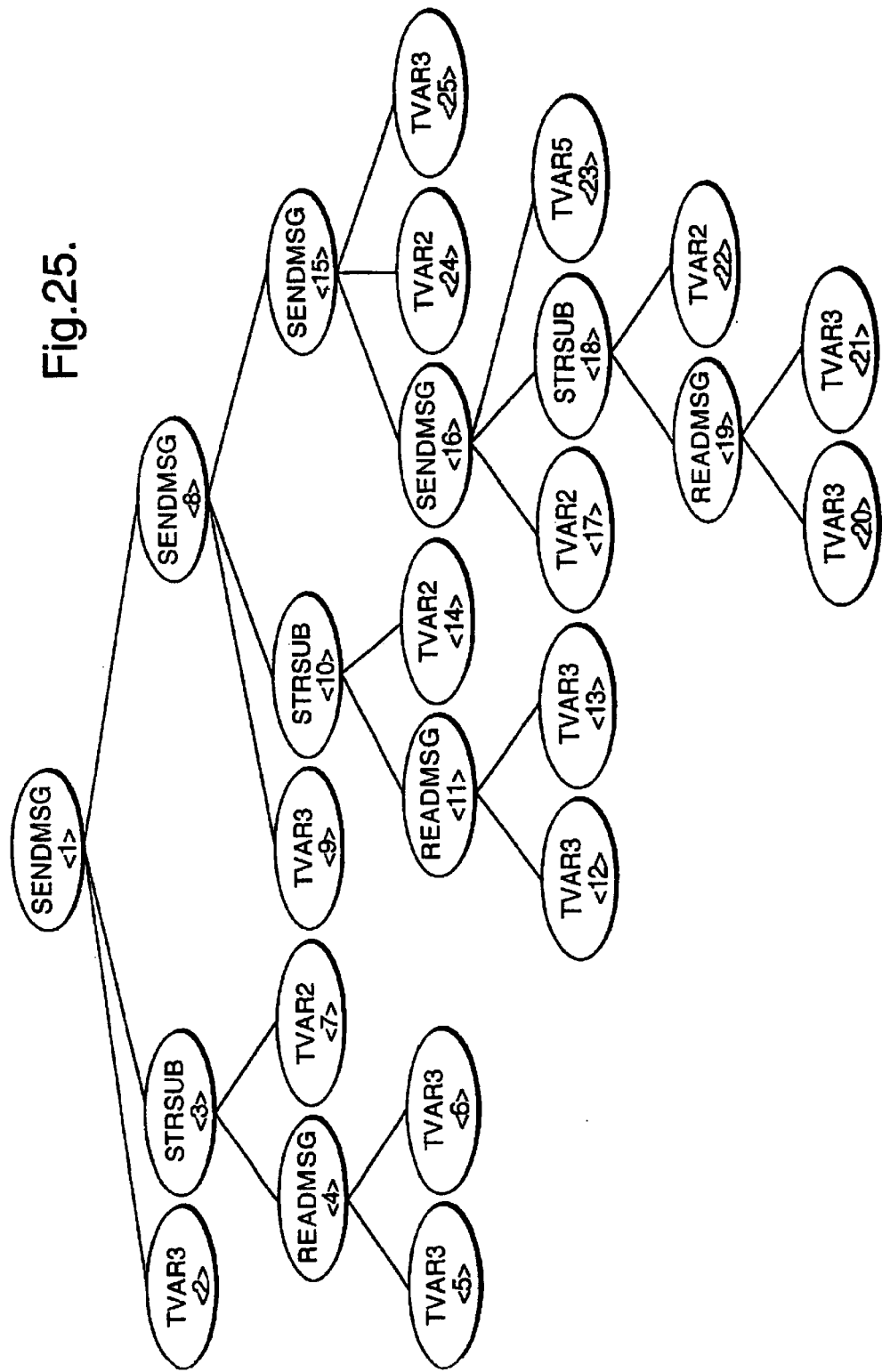
FIG. 25 shows an example program tree using reduced complexity functions.

As an example of the difference in output, an example from this experiment, run 1 is shown in FIG. 25.

An interesting feature of this particular example is the regularity with which the pattern at nodes 3, 4, 5, 6 and 7 occur. This pattern is repeated at the sub-trees rooted as nodes 10 and 18. It is likely that using Automatically Defined Functions (ADFs) [Koz94] for this level of functions would be beneficial since there are repeating patterns emerging.

In order to be able to estimate the difficulty of any problem, some means of expressing the problem in its constituent parts is required. The table below summarises the experiments in terms of the problem complexity, and the corresponding results.

In all cases, the results are for a population M=500, and the number of generations I=200.

The average time for a run to complete is taken as the total wall clock time of the experiment divided by the number of runs, which was 50 in each case.

|  | Input requirements | | | Output results | | | | |
| --- | --- | --- | --- | --- | --- | --- | --- | --- |
|  | | | | Av. time | Av. | | | |
| Exp. No. | Input States | Params. | Paths | per run (secs) | Complex of fittest | P (M, i) | R (z) | $\epsilon$ |
| 1 | 6 | 2 | 1 | 42 | 13 | 81 | 3 | 1,500 |
| 2 | 8 | 3 | 1 | 44 | 19 | 72 | 4 | 2,000 |
| 3 | 6 | 2 | 2 | 117 | 21 | 25 | 17 | 8,500 |
| 4 | 9 | 3 | 2 | 124 | 32 | 17 | 25 | 12,500 |
| 5 | 8 | 3 | 1 | 71 | 28 | 82 | 3 | 1,500 |

The data presented is not the only data pertaining to the experiments but attempts to identify any useful patterns that may exist in the system.

The day presented is not the only data pertaining to the experiments but attempts to identify any useful patterns that may exist in the system.

Considering the experiments referred to above, the results presented in experiment 2 show that even for small problems, there is more than one program that satisfies the problem statement. This can be argued as true program induction taking place, since any mechanical translation or mapping of the input specification would result in the same program every time. Surprisingly, every experiment resulted in 100% diversity in the solutions found giving some indication of the size of the solution space, even when using a small number of nodes. This result is important since it confirms the idea that for any given problem statement there is a very large number of possible programs that satisfy the problem statement.

It is clear from the experiments, that as the problems get 'harder' the longer a solution will take to be found, and the greater the population size or the greater the number of attempts required to find a solution. Unfortunately, there is no standard measure of difficulty in the current GP literature. This is a problem when trying to determine the settings to use in systems to get the best results.

In the context what is described, the difficult of any problem is related to a number of factors:
1. The number of states in the input requirements
2. The number of messages it has to handle
3. The number and position of decision points required Handling decision points required much more computational effort to find a correct program. In a real service, there would be many such decision points, and it is not clear how well this approach can scale to accommodate this requirement.

Much of the literature is concerned with solving problems that have no 100% correct solution. In the problem domain of IN however it is not sensible to consider anything but a 100% correct program. Barring operating system and hardware faults, it is expected that a service will operate correctly for all customers all the time.

This has two effects on using GP.

The evaluation of fitness is simpler since there is no doubt as to whether a program is successful or not.

It requires that the fitness cases cover 100% of the possibilities. In the problems considered here, this is not an issue, but when there are many decision points, the number of fitness cases increases greatly. This obviously has an effect on the time required to complete a run.

The set of control parameters used for the experiments (APPENDIX B) was probably not optimal.

Two questions arise from this:
1. Is there an envelope of operation that gives good results?
2. Is it possible to determine all environment control values by some method?

It should also be noted, that although studies into different control parameter values has shown evidence of some measurable effect on particular problems the scale of effect is often small, and the universality of the effect is often limited, as for instance reported by Goldberg [GKH95] in his study on deme size, and the results presented as part of the GP kernal [Wei97]. These and other questions raises the point made by Goldberg [GO98] that unlike GA there is no good theoretical basis for GP, and that until one is developed we are reliant on empirical methods for determining the operational parameters for GP.

The use of APAMS was very powerful. It meant that evolving programs were not constrained in the shape they took. The memory locations were used for several different purposes in the experiments—targets for storing message parameters, both string and integer, and a source for function arguments, and as a constant value as when used by some examples using the FEQ function. In the last experiment they also contained message types. Extension of APAMS would prove beneficial in future developments such as using it to hold partial or complete messages.

APAMS also contributed to the great variety seen in the 100% correct solutions by avoiding the need to restrict the semantic structure as in [HWSS95], [Mon95], [CY97] and others. To examine this claim, a simple hypothetical case can be considered such as the FSTART function. A strict typing of this by a human programmer during the early stages of building a GP system could define this function returning a status, or particular parameter to a calling function and having arguments of type DialledNumber for the first and some other type for the second. Immediately it can be seen that by adding these constraints, a human programmer imposes their own perceived structure on the function and therefore it's place in any tree. Doing this would preclude two out of three solutions in Experiment 2.

The work originally by Koza [Koz92] used LISP as the implementation language. This was attractive in one sense in that the programs that were evolved were LISP s-expressions, and could be executed by the run-time environment without any external translation. Using C++ means that the structures being evolved cannot be used directly as programs and an additional stage needs to be added if the output is to be used in any practical application. This does have one big advantage however, in that the structures can be viewed as high level languages and are therefore amenable to mechanical translation and optimisation, for example using the techniques described in [Ben96] and [Hlb96].

The original choice of abstraction for the internal nodes gave satisfactory results, but as shown in experiment 5, a lower level of abstraction gives a better overall performance (higher probability of yielding a 100% correct program) using the same basic system architecture, but required approximately 40% more processing effort. Interestingly the average complexity of the reduced complexity experiment was also approximately 40% greater than the standard experiment. This suggests there may be a direct link between the two measures. Additionally, it is suggested that using ADFs could well be useful in this case. Clearly more work is required in order to arrive at an optical level of abstraction.

The initial choice of the function set and terminal set had some interesting properties. Firstly, most of the external behaviour was determined by the state affecting functions FSTART, BDBREAD, FROUTE and FEND. The only non state affecting function STRSUB and in later experiments FEQ had the ability to appear in a program in one of two modes:
1. Result affecting
2. Non result affecting.

The latter mode introduced introns into the program, allowing it to evolve via more than one route. Clearly, the state affecting functions could not operate as introns. The use of Explicitly Defined Introns (EDI) as described by Nordin [NFB96] has the potential to improve the performance of GP, but it has also been reported by Blickle [Bli96] and Andre [AT96] that EDI can degrade the performance in some applications. The utility of EDI appears to be problem specific.

A question that arises when this type of system is discussed is the degree of confidence with which the result can be trusted. There is a perception that a program created by human is somehow more trustworthy than one created by a machine. This perception is not helped when looking at large, apparently unstructured programs generated by GP systems. The flaw in this perception is that for all programs whether created by a human or by some mechanical means the final arbiter of correctness is the behaviour of the program, or more properly does the program behave as the specification requires it to? Consider a common example of a simple C program such as shown in FIG. 26:

While the program may be obvious to a human reader, the output from an optimising compiler would be hard to follow, and the execution ordering of the machine instructions in a modern RISC chip could be understood by only the most knowledgeable of engineers, yet our experience gives us confidence that the program will work correctly.

The opaqueness of machine generated programs can of course be considered to be a positive attribute in that it forces the systems engineer to look more closely at the specification and the associated system testing. A consequence of this is that the systems engineer must specify exactly what the system should do, not as the introduction to Koza's third book [KABK98] states ' . . . a high level statement of the requirements . . . '.

The question concerning the opaqueness of programs generated using GP or other EC technique has inspired some work to try to address the perceived deficiency. For instance Pringle [Pri95] suggests an approach that tries to create programs that look like those produced by a human programmer, while Langdon [Lan98] has dedicated a whole book to automatic programming adopting techniques used by human programmers as building blocks. A potential flaw in this approach is that practices such as modularity, data hiding, object oriented disciplines, data structures and other 'good engineering practices' have been developed to aid human programmers in writing fault free and maintainable software. They are not of themselves required for a program to be correct and while the aforementioned work has delivered some useful techniques and insights it does not address any of the essential features of GP. A counter argument has been made by Blickle [Bli96] pointing out that a clear structured program can give valuable insights into the problem being solved. For example when trying to find an analytical expression to difficult integral equations, a clear analytic expression would allow further investigation of the problem. However it is worth revisiting the original inspiration for this work and noting that Darwin observed 'nature cares nothing for appearances, except so far as they may be useful to any being' [Dar1859] (Chapter IV, 'Natural Selection').

Lastly the question of whether GP can perform as well as or better than a human programmer needs to be considered. Earlier it was claimed that GP would only be worthwhile if it could generate an implementation in a shorter time and with fewer defects that a human. The problems considered in this paper have been trivial compared to those encountered in existing IN systems, and comparing these results directly with a human is not a reliable indication of scalability. However an indication that GP is as least as good as a human for simple services can be seen when ad-hoc experiments with a few engineers show that a simple number translation service requires less than an hour of effort to complete using Inventor. This compares well with the results in Table 12. If the first correct program was chosen, then the time required by GP can be measured in minutes.

As has been shown above, Genetic Programming can be used to generate service logic for an Intelligent Network application, namely Number Translation.

Once the system had been set-up, the elapsed time required to create the service logic program was several orders of magnitude less than using the existing manual tool-kits available for simple services, thereby potentially reducing the time required to create IN services.

The level of defects in the generated application due to implementation errors is zero due to the fitness evaluation applied to the application. The level of defects due to errors in requirements should be reduced since more attention is needed at the specification stage.

What is presented uses a new and novel memory architecture, which removes the need for strict typing. In contrast to strict typing, there is no such thing as a syntactically incorrect program, which leaves the GP system free to evolve a semantically solution.

Appendix A. Glossary

This appendix explains the abbreviations used which are specific to telecommunications and Intelligent Networks.
DTMF Dual Tone Multi Frequency. A dual audio tone signalling method used by telephone instruments to indicate to the switch the digits 0–9 and the * and # symbols.
ICON A graphical abstraction of a building block used in the GPT GAIN Inventor™ product
IN Intelligent Networks. The use of standard computing platforms to extend the functionality of traditional telephone networks.
INAP Intelligent Network Application Part. The standard protocol defined to allow the SSP and SCP to communicate with each other.
SCP Service Control Point. The Intelligent network node that contains the service logic programs.
SDP Service Data Point. This function provides traditional database support the service logic.
SS7 Signalling System number 7. An internationally agreed standard for carrying signalling information between nodes in a telephony network.

SSP Service Switching Point. The traditional Stored Program switch that contains the IN trigger and message functions.

SMP Service Management Point. A network and customer management system.

TCAP Transaction Capability Part. The transaction layer in the SS7 stack.

Appendix B. Run Time Parameter Values

Within the GP Kernal there are a number of tuneable parameters. In order to gain an insight into the performance of GP for different problems without introducing other variables, the variable factors were kept the same throughout all the experiments and are listed here for reference.

| Parameter | Value | Comments |
| --- | --- | --- |
| PopulationSize | 10 | |
| NumberofGenerations | 200 | |
| CreationType | 2 | 2 = ramped half and half |
| CrossoverProbability | 100 | Crossover operations will always be used |
| CreationProbability | 0 | No replacement of a subtree with random subtree during crossover |
| MaximumDepthForCreation | 10 | |
| MaximumDepthForCrossover | 17 | |
| SelectionType | 1 | Use tournament selection |
| TournamentSize | 10 | Size of the tournament |
| DemeticGrouping | 1 | ON |
| DemeSize | 10 | |
| DemeticMigProbability | 10 | |
| SwapMutationProbability | 10 | |
| ShrinkMutationProbability | 10 | |
| SteadyState | 0 | Not steady state |
| AddBestToNewPopulation | 1 | Always reproduce best of generation |

Bibliography

[ABK96] Andre D, Bennett III and Koza J R. *Discovery by Genetic Programming of a Cellular Automata Rule that is Better than any Known Rule for the Majority Classification Problem.* In Koza J R, Goldberg D E, Fogel D, and Riolo R. (Eds). Genetic Programming 1996: Proceedings of the First Annual Conference, pp.3–11, Jul. 28–31, 1996, Stanford University. Cambridge, Mass. MIT Press.

[Ang97a] Angeline P. *Subtree Crossover: Building Block Engine or Macromutation?* pp.9–17 In Koza J, Deb K Dorigo M, Fogel D. B, Garzon M, Iba H, and Riolo R (Eds.) Genetic Programming 1997. Proceedings of the Second Annual Conference Jul. 13–16, 1997 Stanford University. Morgan Kaufmann Publishers, San Francisco, Calif.

[ASS97] Aiyark P, Saket, A. S and Sinclair, M. C., *Genetic Programming Approaches for Minimum Cost Topology Optimisation of Optical Telecommunications Networks*, Proc. IEE/IEEE Intl. Conf. On Genetic Algorithms in Engineering Systems: Innovations and Applications (GALESIA '97), University of Strathclyde, Glasgow, September 1997, pp.415–420.

[Ban93] Banzhaf W. *Genetic programming for pedestrians.* In Forrest S. Examining Division., proceedings of the 5th International Conference on Genetic Algorithms, ICGA-93. Page 628, University of Illinois at Urbana-Champaign, 17–21 Jul., 1993. Morgan Kaufmann.

[BFN99] Banzhaf W., Francone F., and Nordin P. *The Effect of Extensive Use of the Mutation Operator on Generalization in Genetic Programming Using Sparse Data Sets.* In Goos G., Hartmanis J., and van Leewen J. (Eds.) Parallel Problem Solving from Nature: Proceedings International Conference on Evolutionary Computation, The 4th Conference on Parallel Problem Solving from Nature, Berlin, Germany, Sep. 22–26, 1996, Springer-Verlag.

[BNO97] Banzhaf W, Nordin P, and Olmer M. *Generating Adaptive Behaviourfor a Real Robot using Function Regression within Genetic Programming.* Pp.35–43 In Koza, J, Deb K Dorigo M, Fogel D. B, Garzon M, Iba H, and Riolo R (Eds.) Genetic Programming 1997. Proceedings of the Second Annual Conference Jul. 13–16, 1997 Stanford University. Morgan Kaufmann Publishers, San Francisco, Calif.

[Ben96] Bennet, Jeremy, P., *Introduction to Compiling Techniques.* Second Edition, 1996. McGraw-Hill Publishing Company, England.

[BG95] Bergadano F, and Gunetti D. 1995. *Inductive Logic Programming: From Machine Learning to Software Engineering.* MIT Press, 1995.

[Bli96] Blickle. T. *Evolving Compact Solutions in Genetic Programming: A Case Study.* In Voight H., Ebeling W., Recenberg I., Schwefel H., (Eds.): Parallel Problem Solving from Nature IV. Proceedings of the International Conference on Evolutionary, Berlin, September 1996, LNCS 1141, pp.564–573, Heidelberg. Springer-Verlag.

[Boe81] Boehm B. W. *Software Engineering Economics.* 1981 Prentice Hall.

[CY97] Clack T, and Yu T. *Performance Enhanced Genetic Programming.* In Angeline P., Reynolds R., McDonald J., and Eberhart R., Eds., Proceedings of the sixth conference on Evolutionary Programming, Volume 1213 of Lecture Notes in Computer Science, Indianapolis, Ind., USA 1997, Springer-Verlag.

[Dar1859] Darwin, Charles. *On the origin of species by Means of natural Selection, or the Preservation of Favoured Races in the Struggle for Life.* 1st Edition. 1859.

[Dav93] Davis A M. *Software Requirements; Objects, Functions and States.* 1993. Prentice Hall.

[Ebe98] Eberhagen S. *Considerations for a successful introduction of Intelligent Networks from a marketing perspective.* In the Proceedings of the 5th International Conference on Intelligence in Network, Bordeaux, France. 13/15 May 1998. Adera, France.

[GR94] Cathercole C and Ross P. *Dynamic Training Subset Selection for Supervised Learning in Genetic Programming.* Davidor Y, Schwefel H and Manner R (Eds) Parallel Problem Solving from Nature III, Jerusalem, 9–14 Oct. 1994. Springer-Verlag.

[GR97] Gathercole C and Ross P. *Small Populations over Many Generations can beat Large Populations over Few Generations in Genetic Programming.* Pp.111–118 In Koza J, Deb K Dorigo M, Fogel D. B, Garzon M, Iba H, and Riolo R (Eds.) Genetic Programming 1997. Proceedings of the Second Annual Conference July 13–16, 1997 Stanford University. Morgan Kaufmann Publishers, San Francisco, Calif.

[GD91] Goldberg D. E., and Deb K. 1991. *A comparative analysis of selection schemes used in genetic algorithms.* In Rawlings G. (Examining Division), Foundations of Genetic Algorithms Morgan Kaufmann.

[GKH95] Goldberg, David E, Kargupta Hillol, Horn Jeffrey and Cantu-Paz Erik. *Critical Deme Size for Serial and Parallel Genetic Algorithms.* IlliGAL Report No. 95002 January 1995.

[GO98] Goldberg, David E., and O'Reilly, Una-May. *Where Does the Good Stuff Go, and Why? How Contexual semantics influences program structure in simple genetic programming*, in Banzhaf W., Poli R., Schoenauer M., and Fogarty T. C., (Eds.): First European Workshop, EuroGP'98, Paris, France, April 1998 Proceedings. LNCS 1391, Springer-Verlag.

[Mar96] Martin, Peter, N. *Service Creation for Intelligent Networks: Delivering the Promise*. Proceedings of the $4^{th}$ International Conference on Intelligence in Networks, Bordeaux. 1996. ADERA.

[Mar95] Montana, David, J. Strongly Typed Genetic Programming. Evolutionary Computation. Volume 3, Issue 2, pp.199–230. Summer 1995. MIT Press.

[NFB96] Nordin P., Francone F., and Banzhaf W. *Explicitly Defined Introns and Destructive Crossover in Genetic Programming*. In Angeline., and Kinnear K., Eds., Advances in Genetic Programming 2, Chapter 6, pp. 111–134. MIT Press, Cambridge, Mass., USA, 1996.

[Per94] Perkis, Timothy. *Stack Based Genetic Programming. In the proceedings* of the 1994 IEEE World Congress on Computational Intelligence 1994. Volume 1, pages 148–153, Orlando, Fla., USA, 27–29 June 1994. IEEE Press.

Pri95] Pringle W. *ESP: Evolutionary Structured Programming*. Technical Report, Penn State University, Greate Valley Campus, Pa., USA, 1995.

[SEL95] Sharman K., Anna I. Esparcia A., and Yun Li. *Evoking signal processing algorithms by genetic programming*. In A. M. S. Zalzala, editor, First International Conference on Genetic Algorithms in Engineering Systems: Innovations and Applications, (GALESIA), volume 414, pages 473–480, Sheffield, UK, 12–14 Sep. 1995. IEE.

(SS97] Sinclair M., and Shami S. *Evolving Simple Software Agents: Comparing Genetic Algorithm and Genetic Programming Performance*. Proceedings of the second IEE/IEEE Intl. Conf. On Genetic Algorithms n Engineering Systems: Innovations and Applications (GALESIA '97), University of Strathclyde, Glasgow, September 1997, pp.421–426.

[Som96] Sommerville I. *Software Engineering*. Fifth Examining Division. 1996. Addison Wesley Publishers Ltd.

[TCM98] Tang L. Califf M., Mooney R. *An Experimental Comparison of Genetic Programming and Inductive Logic Programming on Learning Recursive List Functions*. Technical Report, University of Texas, Austin. Number A198-27. March 1998.

[Tel94] Teller, Astro. *Turing Completeness in the Language of Genetic Programming with Indexed Memory*. Proceedings of the 1994 IEEE World Congress on Computational Intelligence, volume 1, Orlando, Fla., USA. June 1994. IEEE Press.

[TA97] Teller, Astro and Andre David. *Automatically choosing the Number of fitness Cases: The rational Allocation of Trials*. pp.321–328 In Koza J, Deb K, Dorigo M, Fogel D. B, Garzon M, Iba H, and Riolo R (Eds.) Genetic Programming 1997. Proceedings of the Second Annual Conference Jul. 13–16, 1997 Stanford University. Morgan Kaufmann Publishers, San Franscisco, Calif.

[Hol92] Holland, John, J. *Adaptation in Natural and Artificial Systems*: Ann Arbor, Mich.: University of Michigan Press 1975. Revised $2^{nd}$ edition 1992 from the MIT press.

[Hlb90] Holub, Alan, I., *Compiler Design in C*. $1^{st}$ edition. Prentice Hall.

[HWSS95] Haynes, T., Wainwright R., Sen S., and Schoenefeld D., *Strongly Typed Genetic Programming in Evolving Cooperation Strategies*. In Eshelman L., (Examining Division) Genetic Algorithms: Proceedings of the Sixth International Conference (ICGA95), pages 271–278, Pittsburgh, Pa.<USA, 15–19 Jul. 1995. Morgan Kaufmann.

[Iba96] Iba, Hitoshi *Random Tree Generation for Genetic Programming*. In Goos G., Hartmanis J., and van Leewen J. (Eds.) Parallel Problem Solving from Nature: Proceedings International Conference on Evolutionary Computation, The $4^{th}$ Conference on Parallel Problem Solving from Nature, Berlin, Germany, Sep. 22–26, 1996, Springer-Verlag.

[(Itu94a] ITU-T Q.1211. *Introduction to Intelligent Networks* CS-1 1994.6

[JCC92] Jefferson D, Collins R, Copper C, Dyer M, Flowers M Karf R, Taylor C and Wang A. *Evolution as a theme in Artificial Life: The Genesys/Tracker System*. In Langton C et al (Eds), Artificial Life II. 1992. Addison-Wesley Publishing Company Inc.

Koz92] Koza, John, R. Genetic Programming. *On the Programming of Computers by Means of Natural Selection*. $1^{st}$ Edition MIT Press 1992.

[Koz94] Koza John R. *Genetic Programming* II. *Autonatic Discovery of Reusable Programs*. $1^{st}$ Edition MIT Press, 1994.

[Koz96] Koza John R. *Comments on Cross Paradigm Comparisons of Genetic Programming with existing machine learning paradigms*.

[KBF96] Koza J R, Bennett III, Forrest H, Andre D, Keane M. *Automated WYWIWYG design of both the topology and component values of analogue electrical circuits using genetic programming*. In Koza J R, Goldberg D E, Fogel D, and Riolo R. (Eds). Genetic Programming 1996: Proceedings of the First Annual Conference, Jul. 28–31, 1996, Stanford University. Cambridge, Mass. MIT Press.

[KABK98] Koza John R. Andre David, Bennett Forret H and Keane, Martin. *Genetic Programming* III Unpublished draft version, available on the GP MAILING LIST.

[Lan97] Langdon W B. ntrees. cc—A program to calculate size of GP random trees. cs.bham.ac.uk/pub/authors/W.B, Langdon/gp-code Visited $14^{th}$ Jun. 1997.

[Lan98] Langdon W B. *Genetic Programming and Data structures: Genetic Programming and Data structures=Automatic Programming*! $1^{st}$ Edition. The Kluwer International Series in Engineering and Computer Science. Vol. 438. Kluwer Academic Publishers, Boston, 1998.

[LS97] Luke S, and Spector L. *A comparison of crossover and Mutation in Genetic Programming*. In Koza, J, Deb K, Dorigo M, Fogel D. B, Garzon M, Iba H and Riolo R (Eds.) Genetic Programming 1997. Proceedings of the Second Annual Conference, pp.240–248, Jul. 13–16, 1997 Stanford University. Morgan Kaufmann Publishers, San Francisco, Calif.

What is claimed is:

1. A method of creating a specified service having a series of service requirements on an intelligent network (IN) system including a basic call state machine (BCSM) and a service switching point (SSP), the method comprising the steps of:

a) creating programs to operate the BCSM to provide said specified service from the service requirements necessary to provide said specified service, the programs being created by using evolutionary programming;

b) evaluating a fitness function as a weighted sum of a number of correctly sequenced messages that the SSP in the IN would see and a weighted sum of a number of correct message parameters that the SSP would see for each of the programs created; and c) selecting a program from the programs created on the basis of an evaluated fitness function for each program.

2. The method as claimed in claim 1, wherein the evolutionary programming is genetic programming (GP).

3. The method as claimed in claim 2, and further comprising the step of creating an initial population of programs using a ramped half and half method.

4. The method as claimed in claim 1, wherein the fitness function is a simulation of the SSP interface that can send a message to an individual program with data parameters according to a relevant state diagram and accept messages and inspect message parameters according to the relevant state diagram.

5. The method as claimed in claim 4, wherein a data type is autonomous polymorphic addressable memory.

6. A service creation arrangement for a specified service having a series of service requirements on an intelligent network (IN) system including a basic call state machine (BCSM) and a service switching point (SSP), comprising: programming means using evolutionary programming for creating programs to operate the BCSM to provide the specified service from the service requirements; fitness evaluating means for evaluating a fitness function as a weighted sum of a number of correctly sequenced messages that the SSP in the IN would see and a weighted sum of a number of correct message parameters that the SSP would see for each of the programs created; and selection means for selecting a program from the programs created on the basis of an evaluated function for each program.

7. The service creation arrangement as claimed in claim 6, wherein the programming means employs genetic programming.

8. The service creation arrangement as claimed in claim 7, and further comprising initial population creation means for programs which use a ramped half and half method.

9. The service creation arrangement as claimed in claim 6, wherein the fitness function provides a simulation of the SSP interface that can send a message to an individual program with data parameters according to a relevant state diagram and accept messages and inspect message parameters according to the relevant state diagram.

10. The service creation arrangement as claimed in claim 6, wherein autonomous polymorphic addressable memory is used as a data type.

* * * * *